(12) United States Patent
Su et al.

(10) Patent No.: US 9,046,367 B2
(45) Date of Patent: Jun. 2, 2015

(54) MICRO-ELECTRO-MECHANICAL-SYSTEM DEVICE WITH OSCILLATING ASSEMBLY

(75) Inventors: Chung-Yuan Su, Taichung (TW); Chao-Ta Huang, Hsinchu (TW); Shih-Chieh Lin, Kaohsiung (TW); Yu-Wen Hsu, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 329 days.

(21) Appl. No.: 13/459,270

(22) Filed: Apr. 30, 2012

(65) Prior Publication Data

US 2013/0167635 A1    Jul. 4, 2013

(30) Foreign Application Priority Data

Dec. 30, 2011  (TW) .............................. 100149887 A

(51) Int. Cl.
G01C 19/56 (2012.01)
G01C 19/5747 (2012.01)

(52) U.S. Cl.
CPC ................................... *G01C 19/5747* (2013.01)

(58) Field of Classification Search
CPC .............................. G01C 19/56; G01P 15/125
USPC ....................................................... 73/504.12
See application file for complete search history.

(56) References Cited

U.S. PATENT DOCUMENTS

| | | | |
|---|---|---|---|
| 5,349,855 A | 9/1994 | Bernstein et al. | |
| 5,505,084 A | 4/1996 | Greiff et al. | |
| 5,635,639 A | 6/1997 | Greiff et al. | |
| 5,757,103 A | 5/1998 | Lee et al. | |
| 5,767,405 A | 6/1998 | Bernstein et al. | |
| 5,780,739 A | 7/1998 | Kang et al. | |
| 5,796,001 A | 8/1998 | Greiff et al. | |
| 6,257,059 B1 | 7/2001 | Weinberg et al. | |
| 6,393,913 B1 | 5/2002 | Dyck et al. | |
| 6,487,864 B1 | 12/2002 | Platt et al. | |

(Continued)

FOREIGN PATENT DOCUMENTS

| | | |
|---|---|---|
| CN | 101876547 | 11/2010 |
| CN | 102012434 | 4/2011 |

(Continued)

OTHER PUBLICATIONS

Azgin et al., "An SOI-MEMS Turning Fork Gyroscope With Linearly Coupled Drive Mechanism,", 2007 IEEE 20th International Conference on Micro Electro Mechanical Systems, Jan. 2007, pp. 607-610.

(Continued)

*Primary Examiner* — Hezron E Williams
*Assistant Examiner* — Mark A Shabman
(74) *Attorney, Agent, or Firm* — Jianq Chyun IP Office

(57) ABSTRACT

A micro-electro-mechanical-system (MEMS) device comprising two proof masses disposed in the first frame, such that the MEMS device with oscillating assemblies senses the angular velocity in the two axes, respectively. The MEMS device with oscillating assemblies further comprises a lever structure and two oscillating assemblies connecting at two opposite ends of the lever structure, such that the oscillating assemblies move in opposite directions synchronously. The MEMS device with oscillating assemblies further comprises a spring assembly connected between the proof mass and a movable electrode, restricting the proof mass to drive the movable electrode to only move in a specific direction.

29 Claims, 28 Drawing Sheets

(56) References Cited

U.S. PATENT DOCUMENTS

| | | | |
|---|---|---|---|
| 6,509,670 B2 * | 1/2003 | Jeong et al. | 310/309 |
| 6,561,029 B2 * | 5/2003 | Folkmer et al. | 73/504.14 |
| 6,578,420 B1 | 6/2003 | Hsu | |
| 6,823,733 B2 | 11/2004 | Ichinose | |
| 6,892,575 B2 | 5/2005 | Nasiri et al. | |
| 6,901,799 B2 | 6/2005 | Chen et al. | |
| 6,939,473 B2 | 9/2005 | Nasiri et al. | |
| 6,952,965 B2 | 10/2005 | Kang et al. | |
| 7,004,024 B1 | 2/2006 | Park | |
| 7,043,985 B2 | 5/2006 | Ayazi et al. | |
| 7,191,653 B2 | 3/2007 | Park et al. | |
| 7,267,005 B1 | 9/2007 | Kranz et al. | |
| 7,319,372 B2 | 1/2008 | Pan et al. | |
| 7,617,728 B2 | 11/2009 | Cardarelli | |
| 7,621,183 B2 | 11/2009 | Seeger et al. | |
| 8,037,757 B2 | 10/2011 | Johnson | |
| 2003/0131664 A1 * | 7/2003 | Mochida et al. | 73/504.12 |
| 2004/0154400 A1 * | 8/2004 | Johnson et al. | 73/514.01 |
| 2005/0066728 A1 | 3/2005 | Chojnacki et al. | |
| 2005/0150297 A1 | 7/2005 | Ayazi et al. | |
| 2006/0010978 A1 | 1/2006 | Lee et al. | |
| 2006/0032306 A1 * | 2/2006 | Robert | 73/504.02 |
| 2006/0117852 A1 | 6/2006 | Park et al. | |
| 2007/0012653 A1 | 1/2007 | Nasiri et al. | |
| 2008/0276707 A1 | 11/2008 | Sutton et al. | |
| 2009/0272189 A1 | 11/2009 | Acar et al. | |
| 2010/0132460 A1 | 6/2010 | Seeger et al. | |
| 2010/0154541 A1 | 6/2010 | Cazzaniga et al. | |
| 2010/0307241 A1 | 12/2010 | Raman et al. | |
| 2011/0154898 A1 | 6/2011 | Cazzaniga et al. | |

FOREIGN PATENT DOCUMENTS

| | | |
|---|---|---|
| EP | 1688705 | 8/2006 |
| TW | 200515605 | 5/2005 |
| TW | I247896 | 1/2006 |
| TW | I275808 | 3/2007 |
| TW | 200916403 | 4/2009 |
| TW | 201120451 | 6/2011 |

OTHER PUBLICATIONS

Trusov et al., "Micromachined rate gyroscope architecture with ultra-high quality factor and improved mode ordering," Sensors and Actuators A 165, 2011, pp. 26-34.

Guo et al., "A Lateral-Axis Microelectromechanical Tuning-Fork Gyroscope With Decoupled Comb Drive Operating at Atmospheric Pressure," Journal of Microelectromechanical Systems 19 (3), Jun. 2010, pp. 458-468.

Wen et al., "Suspension system design study for a tuning fork vibratory MEMS gyroscope," Proc. of SPIE 7130, 2008, pp. 41300J-1-41300J-6.

Office Action of Taiwan Counterpart Application, issued on Apr. 23, 2014, p. 1-p. 4, in which the listed references were cited.

* cited by examiner

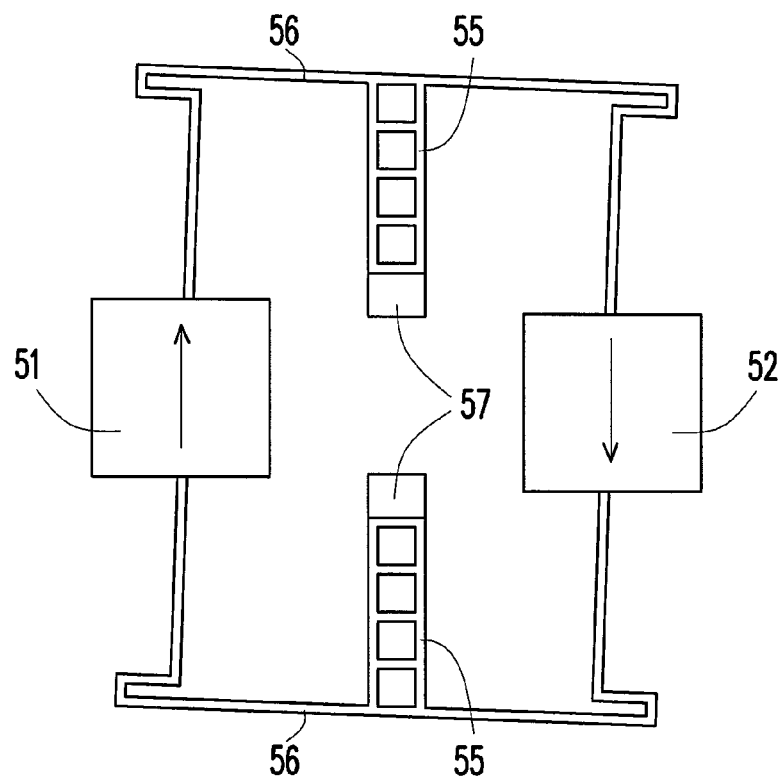
FIG. 11B
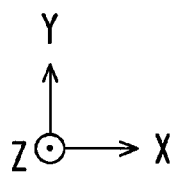
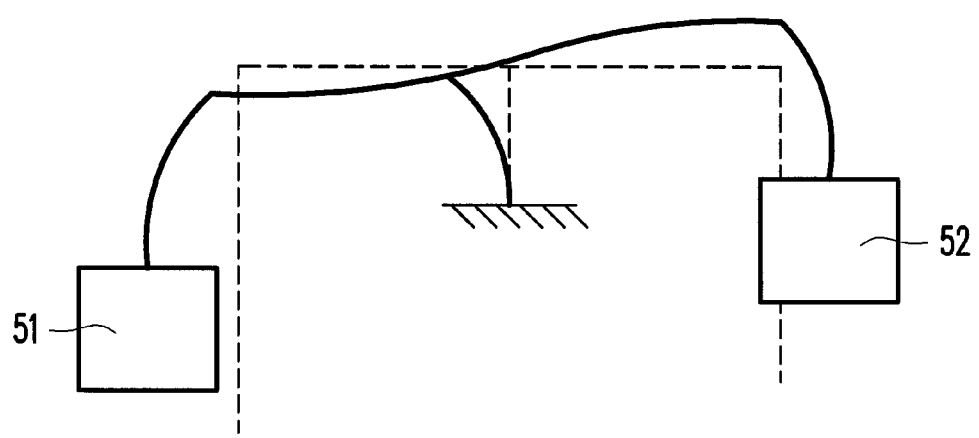
FIG. 11C

MICRO-ELECTRO-MECHANICAL-SYSTEM DEVICE WITH OSCILLATING ASSEMBLY

CROSS-REFERENCE TO RELATED APPLICATION

This application claims the priority benefit of Taiwan application serial no. 100149887, filed on Dec. 30, 2011. The entirety of the above-mentioned patent application is hereby incorporated by reference herein and made a part of this specification.

BACKGROUND

1. Technical Field

The disclosure relates to a micro-electro-mechanical system (MEMS) device. More particularly, the disclosure relates to an MEMS device with oscillating assemblies.

2. Description of Related Art

In recent years, due to the popularity of electronic devices such as smart phones, tablet PCs, and game consoles, the market of MEMS inertia sensors such as accelerometers and gyroscopes (angular velocity meter) has greatly increased. Thus, international companies have invested significant resources to develop high performance and low cost MEMS inertia sensors. With the development of accelerometer technology, a new generation of the angular velocity meters with high performance and low cost has become the main competing product on the market for MEMS inertia sensor vendors.

FIG. 9 is a schematic structural view of a conventional MEMS gyroscope. The MEMS gyroscope 30 includes a proof mass 31, a driving electrode 32, a sensing electrode 33, a suspension beam 34, an anchor 35, and a substrate 36. The proof mass 31 is suspended above the substrate 36 by the suspension beam 34 and the anchor 35.

In a normal condition, the proof mass 31 is driven by the driving electrode 32 to oscillate at natural frequency along an x-axis, and this is referred to as a driving mode of the MEMS gyroscope 30. When the MEMS gyroscope 30 is applied with an external angular velocity $W_z$ along the z-axis, the Coriolis acceleration is generated along the y-axis, thereby. The Coriolis acceleration further affects the proof mass 31 such that it vibrates along the y-axis (sensing direction), and this is referred to as a sensing mode of the MEMS gyroscope 30. The vibration is then measured by the sensing electrode to further calculate the external angular velocity. However, when an additional external acceleration is applied along the y-axis, the proof mass will subsequently have an additional y-axis displacement. This causes the sensing electrode in the sensing mode to generate an additional output signal, which will interfere with the output signal of the MEMS gyroscope 30. A tuning fork type gyroscope can solve the interference of the gyroscope caused by the additional acceleration. FIG. 10A to FIG. 10C are schematic views of an equivalent system of a tuning fork type gyroscope, which depict the tuning fork type gyroscope in the different mode. Referring to FIG. 10A and FIG. 10B, the tuning fork type gyroscope 40 includes two proof masses 41 and 42, a driving electrode 43, a sensing electrode 44, a support spring 45, and an anchor 46.

The proof masses 41, 42 are driven by the driving electrode 43 so that the two proof masses 41, 42 oscillate in opposite directions along the y-axis (e.g. a proof mass 41 moves in the positive y-direction, and the other proof mass 42 moves in the negative y-direction, as seen in FIG. 10A), and give rise to resonance simultaneously (this is referred to as a driving mode). When an external angular velocity $W_z$ is applied along the z-axis, the Coriolis acceleration is induced on the x-axis. The Coriolis acceleration causes the proof masses 41, 42 to oscillate in the opposite directions along the x-axis (this is referred to as a sensing mode). The vibration is then measured by the sensing electrode 44 to further calculate the external angular velocity.

Referring to FIG. 10C, when an additional external acceleration $F_a$ is applied to the tuning fork type gyroscope 40 along the y-axis, the two proof masses 41, 42 will both move along in the positive y-direction or in the negative y-direction. The changes of the capacitance of the tuning fork type gyroscope 40 are detected through differential calculations, so the variation of the capacitance caused by the additional acceleration is zero. Similarly, when the additional external acceleration is applied to the angular velocity meter along the x-axis, the two proof masses 41, 42 will both move in either the positive x-direction or the negative x-direction. This causes the variation of the capacitance to be zero. Thus, the tuning fork type gyroscope 40 can restrain the effect of an additional external acceleration $F_a$ by its structure.

The technology of manufacturing tuning fork type angular velocity meters has two bottlenecks. First, it requires high-precision manufacturing process, and secondly the unexpected lateral displacements are prone to be happened due to variation of the manufacturing process. For example, a tuning fork type gyroscope 40 mainly includes two proof masses 41, 42, and a corresponding support spring 45. When the variations of these parts exist due to the manufacturing, the two proof masses 41, 42 or the spring constant of the support spring 45 do not match. At this point, the natural frequencies of the two proof masses 41, 42 are different, therefore the two proof masses 41, 42 can not resonate and oscillate in the opposite directions with respect to each other simultaneously (i.e. the phase difference is not 180 degrees). The effect of the additional external acceleration can not be eliminated by differential calculation. Consequently, the manufacturing variations described above may affect the sensitivity of the tuning fork type gyroscope 40, or even cause the tuning fork type gyroscope 40 to be malfunctioned.

FIG. 11A is a schematic diagram of a tuning fork type gyroscope of U.S. Pat. No. 7,043,985. FIG. 11B and FIG. 11C are schematic views depict respectively the motion of the equivalent systems of the tuning fork type gyroscope in the FIG. 11A. FIG. 11C only shows a portion of FIG. 11A. Referring to FIG. 11A to FIG. 11C, the tuning fork type gyroscope 50 includes two proof masses 51 and 52, a driving electrode 53, a sensing electrode 54, a support 55, a spring linkage 56, and an anchor 57. The difference between FIG. 10A to FIG. 10C is that the tuning fork type gyroscope 50 of FIG. 11A is connected to the anchor 57 through an end of the support 55. The other end of the support 55 is connected to a center region of the spring linkage 56, to reduce the amount of lateral displacement.

SUMMARY

The disclosure provides an MEMS device with an oscillating assembly.

An embodiment of the disclosure provides an MEMS device, being adapted to sense angular velocities in two orthogonal axes. The MEMS device includes at least one oscillating assembly. The oscillating assembly includes a first frame, a first proof mass, a third frame, a plurality of torsional beams, and a plurality of first springs. The first frame has an oscillating direction along a second axis. The third frame is disposed within the first frame. The first proof mass is disposed within the third frame. The torsional beams connect the first proof mass and the third frame. The first springs connect the first frame and the third frame along a first axis, wherein the first axis is orthogonal to the second axis.

An embodiment of the disclosure provides an MEMS device, being adapted to control the displacement direction of two oscillating units. The MEMS device includes at least one base, at least one lever, at least one first assembly of springs. The first assembly of springs includes two elastic members and at least one support. Each of the elastic members connects the lever and the base. The at least one support connects the at least one lever and the two elastic members. One of the oscillating units is connected to an end of the lever, and the other of the two oscillating units is connected to the other end of the lever.

An embodiment of the disclosure provides an MEMS device, being adapted to restrict the moving direction of at least one movable electrode. The MEMS device includes at least one base, at least one oscillating assembly, a plurality of restraining springs, and at least one second assembly of springs. The at least one oscillating assembly includes a first frame and at least one third proof mass. The first frame has an oscillating direction along a second axis. The at least one third proof mass is disposed within the first frame. The plurality of restraining springs connects the movable electrode and the at least one base. The at least one second assembly of springs traverses the first frame and connects the third proof mass and the at least one movable electrode. The second assembly of springs includes at least one fourth spring and at least one movable linkage. The fourth spring is aligned along the second axis. The first axis and the second axis are orthogonal. An end of the movable linkage is connected to the at least one fourth spring, wherein a moving direction of the movable linkage is orthogonal to the second axis, and is perpendicular to the deposing direction of the at least one movable electrode.

An embodiment of the disclosure provides an MEMS device, being adapted to sense angular velocities in two orthogonal axes. The MEMS device includes at least one base, at least one lever, at least one first assembly of springs, two oscillating assemblies, at least one movable electrode, a plurality of restraining springs, and at least one second assembly of springs. The first assembly of springs includes a plurality of elastic members and a support. The elastic members connect the lever and the base. The support is surrounded by the plurality of elastic members, the at least one lever, and the at least one base. The at least one lever is connected by at least one portion of the support, and each of the plurality of elastic members is respectively connected by at least one other portion of the support. Each oscillating assembly includes a first frame, a third frame, an unbalanced proof mass, at least one torsional beam, and at least one first spring. The first frame is connected to an end of the at least one lever, and the first frame oscillating along a second axis. The third frame is disposed within the first frame. The unbalanced proof mass is disposed within the third frame. The at least one torsional beam connects the unbalanced proof mass and the third frame. The at least one first spring connects the first frame and the third frame along a first axis. The plurality of restraining springs connects the at least one movable electrode and the at least one base, wherein the second-axis stiffness of each of the restraining springs is greater than the first-axis stiffness of the restraining springs. The second assembly of springs traverses the first frame and connects the third frame and the at least one movable electrode. The second assembly of springs includes at least one fourth spring and at least one movable linkage. The at least one fourth spring is disposed along the second axis, and has two ends connected to the third frame. The at least one movable linkage connects the fourth spring and the at least one movable electrode. A moving direction of the at least one is the same as the moving direction of the at least one movable electrode Several exemplary embodiments accompanied with figures are described in detail below to further describe the disclosure in details.

BRIEF DESCRIPTION OF THE DRAWINGS

FIG. 11B and FIG. 11C respectively show schematic views of the equivalent systems of the tuning fork type gyroscope of FIG. 11A under movement.

DETAILED DESCRIPTION OF DISCLOSED EMBODIMENTS

Figure 1:
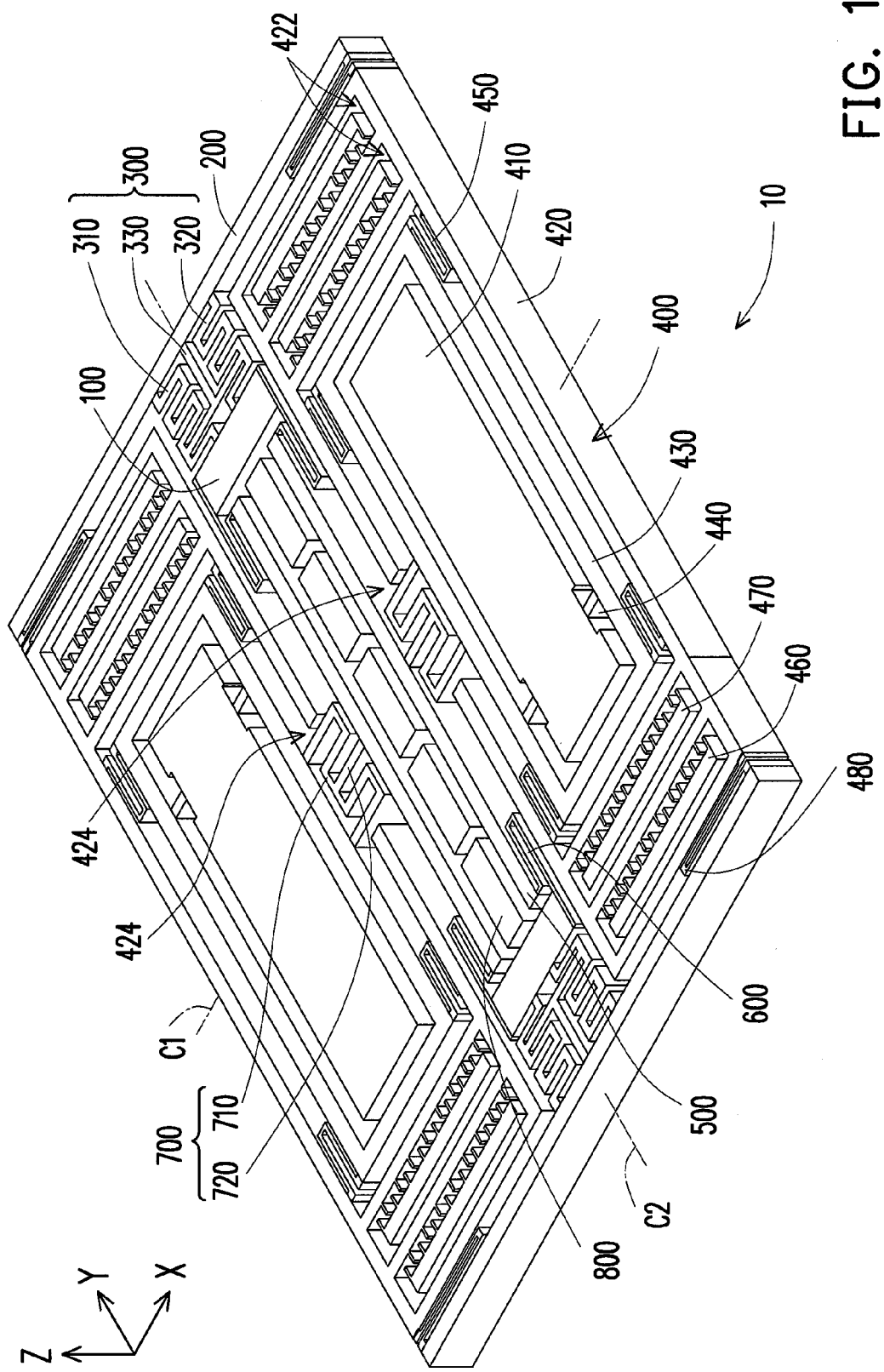
FIG. 1 is a three-dimensional schematic view of an MEMS device with oscillating assemblies according to an embodiment of the disclosure.
Figure 2:
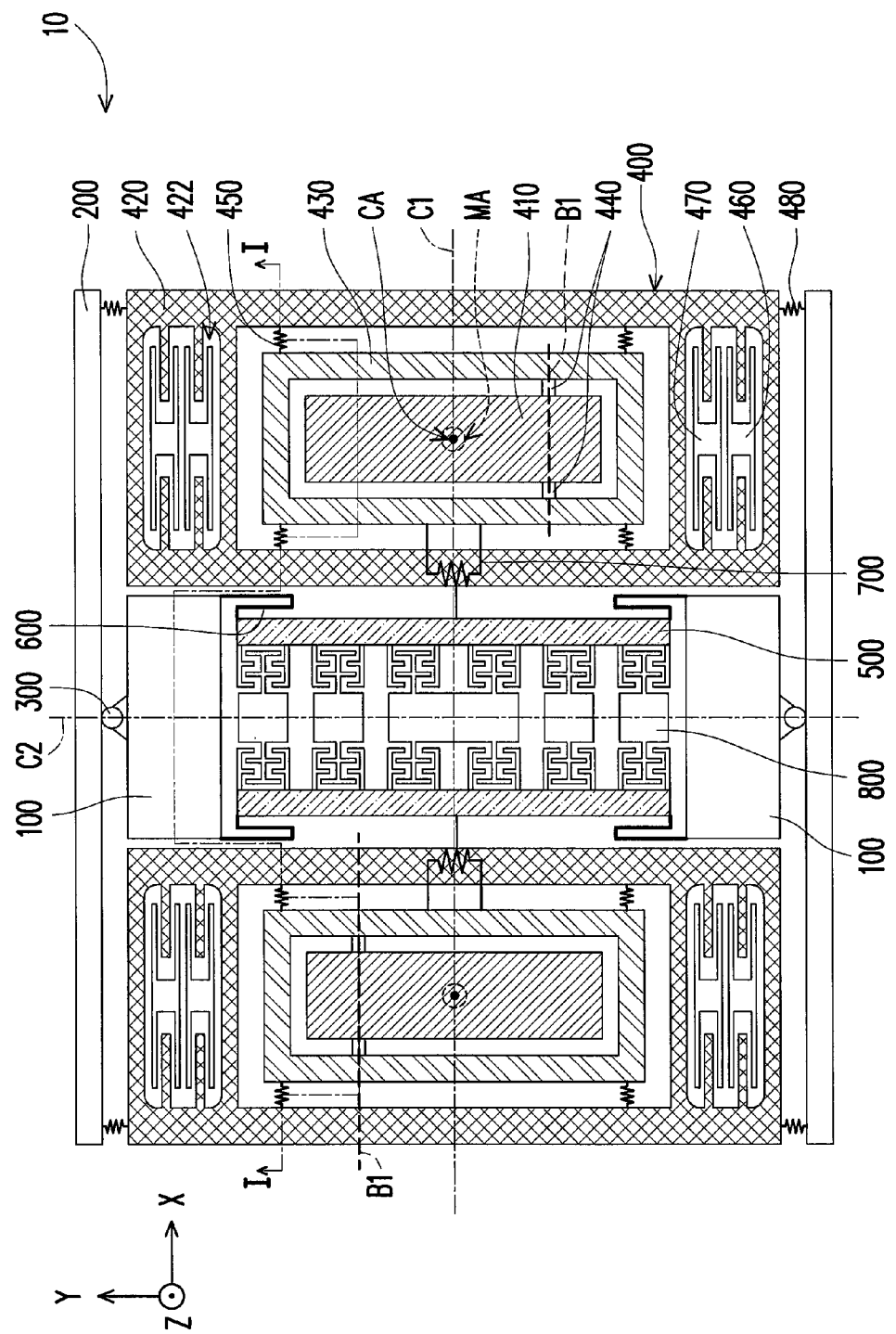
FIG. 2 is a schematic view of an equivalent system of the MEMS device of FIG. 1.

FIG. 1 is a three-dimensional schematic view of an MEMS device with oscillating assemblies according to an embodiment of the disclosure. FIG. 2 is a schematic view of an equivalent system of the MEMS device of FIG. 1. It should be noted that in FIG. 2, for the sake of simplicity in drawing, some structures are omitted compared to FIG. 1, and will be described in other figures afterward. It should also be noted that since the structure of the embodiment has many similar structures and symmetrical configurations, only one side of the structures are labeled with reference numbers. At the same time, a coordinate system is defined (as shown in FIG. 1 and FIG. 2) to describe the status and the movements of parts of the structures.

Referring to FIG. 1 and FIG. 2, in the embodiment, the MEMS device 10 with oscillating assemblies includes two bases 100, two levers 200, two first assembly of springs 300 which are connected between the bases 100 and the levers 200 respectively, two oscillating assemblies 400, two movable electrodes 500, a plurality of restraining springs 600, and a plurality of second assembly of springs 700 traversing a first frame 420 and connected to the movable electrodes 500. It should be noted that the method of the second assembly of springs 700 traversing the first frame 420 includes the method of passing through the first frame 420 or the method of passing over the first frame 420.

In the embodiment of FIG. 1, the first frame 420 of the oscillating assembly 400 includes an opening 424. The method of the plurality of second assembly of springs 700 traversing the first frame 420 is by adopting the method of passing through the first frame 420. In other words, in the embodiment of FIG. 1, the plurality of second assembly of springs 700 pass through the opening 424 of the first frame 420 and connect to the movable electrode 500. However, in the embodiment, the method of the plurality of second assembly of springs 700 traversing the first frame 420 can also adopt the method of passing over the first frame 420 (shown later in the embodiment of FIG. 7A to FIG. 7L).

The two levers 200 are respectively parallel to the x-axis, and are disposed symmetrically at two opposite sides of the oscillating assemblies 400. The first assembly of springs 300 is connected to the center of the lever 200, so the lever 200 can use the first assembly of springs 300 as the fulcrum and rotate by treating z-axis as the axis of rotation. As shown in FIG. 2, in the overall configuration of the MEMS device 10 with oscillating assemblies, the two oscillating assemblies 400 are connected to the two opposite ends of the levers 200 by the buffer springs 480. Each of the oscillating assemblies 400 is also connected to the same side of different levers 200.

In other words, FIG. 2 takes two oscillating assemblies 400 and one of the levers 200 as an example. The two oscillating assemblies 400 are substantially connected to the two opposite ends of the lever 200. The first assembly of springs 300 is connected to the center area of the lever 200 and is between the lever 200 and the base 100. Accordingly, the lever 200 can perform clockwise and counterclockwise rotation through the first assembly of springs 300 with the z-axis as the axis of rotation. This drives the oscillating assemblies 400 to move back and forth along the y-axis. Similarly, the lever 200 located on the other side of the two oscillating assemblies 400 also will move towards the oscillating assemblies 400. Thus, the two levers 200 will both perform clockwise and counterclockwise rotation through its corresponding the first assembly of springs 300 (i.e. the assemblies of springs 300 located on the top and bottom of FIG. 2) and rotate with the z-axis as the axis of rotation. This drives the two oscillating assemblies 400 to move back and forth in the opposite directions with respect to each other along the y-axis.

Figure 3:
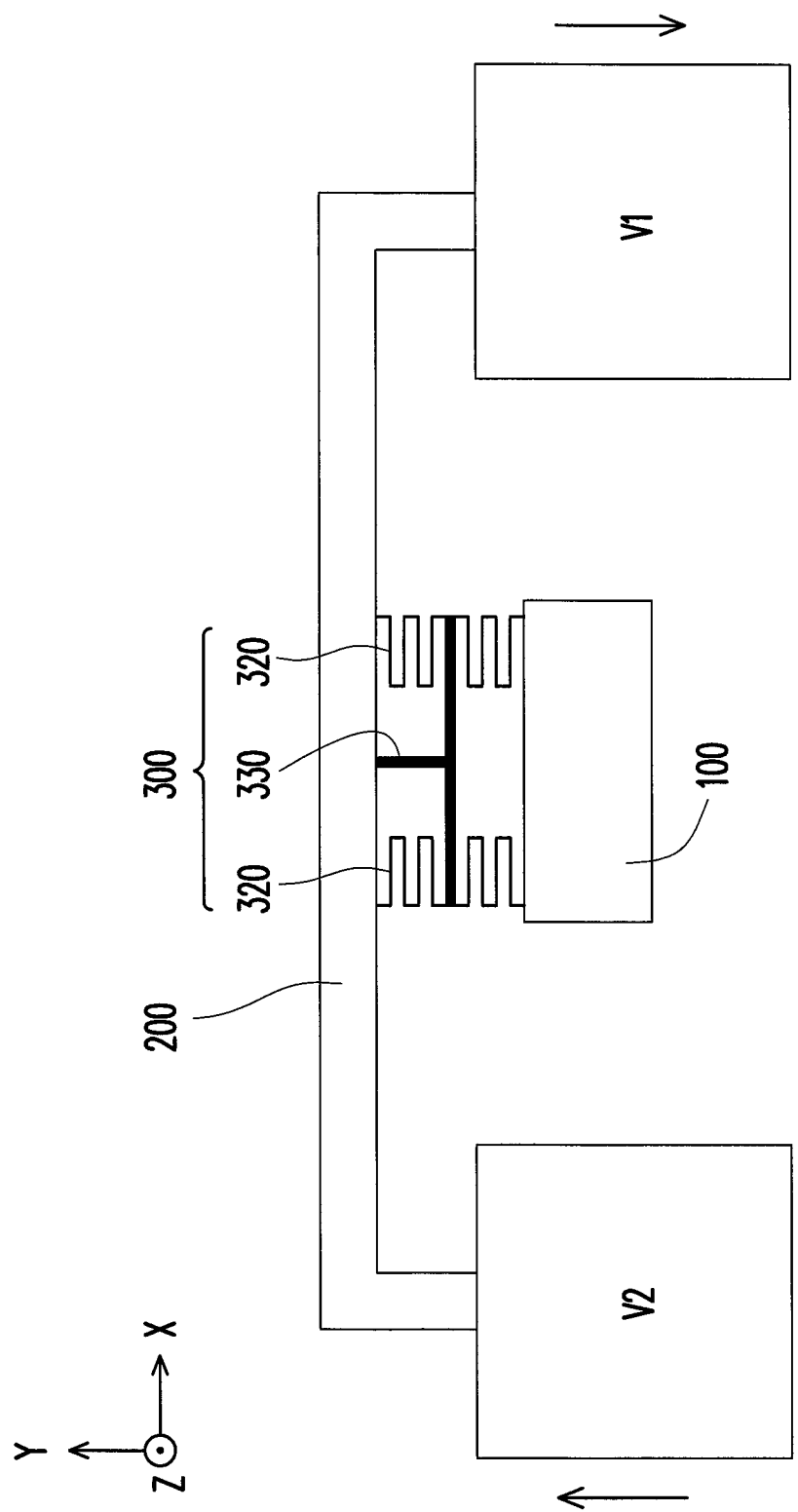
FIG. 3 is a simpler schematic view of the equivalent system of the MEMS device of FIG. 2.

For example, FIG. 3 is a further simplified schematic view of the equivalent system of the MEMS device of FIG. 2. Referring to FIG. 3, the two oscillating assemblies 400 described above can be seen as one of the oscillating units V1 and V2 in the FIG. 3, and it is connected to the base 100 through the lever 200 and the first assembly of springs 300. Accordingly, the driving electrode 460 (shown in FIG. 1 and FIG. 2) can drive the oscillating units V1 and V2 to move in the opposite directions with respect to each other and cause oscillating units V1 and V2 to have the same amount of displacement.

Based on the above, the MEMS device of the embodiment uses a structural design with the levers 200 so that two oscillating assemblies 400 are connected to two ends of the lever 200. Consequently, the displacements of the two oscillating assemblies 400 are the same but the movement directions are opposite. Also, the first assembly of springs 300 can restrain two oscillating assemblies 400 to have only one degree of freedom. Therefore, the oscillating assemblies 400 can resonate with respect to each other without being affected by fabrication variation (i.e. the two oscillating assemblies 400 both perform vibration under natural frequency, but the moving directions of the two oscillating assemblies 400 are opposite to each other). This further enhances the sensitivity of the MEMS device 10.

In further detail, please refer to FIG. 2. Each of the oscillating assemblies 400 includes a first frame 420, a first proof mass 410 (used to detect specific physical properties, such as the angular velocity of the x-axis or the acceleration of the z-axis) and a third proof mass 430 (used to detect specific axial physical properties, such as the angular velocity of the z-axis, the acceleration of the x-axis, or the acceleration of the y-axis) located within the first frame 420, a plurality of torsional beams 440, a plurality of first springs 450, a driving electrode 460, and a feedback electrode 470. In the embodiment, the first frame 420 includes a plurality of openings 422 disposed along the y-axis. The driving electrode 460 and the feedback electrode 470 are disposed respectively in the corresponding openings 422. This allows the driving electrode 460 to drive the first frame 420 to oscillate back and forth along the y-axis. Then the feedback electrode 470 detects the actual oscillating frequency of the first frame 420, and sends it to an application specific integrated circuit (ASIC) of the MEMS device 10 with oscillating assemblies. Next, the ASIC adjusts the driving frequency of the driving electrode 460 so that the actual oscillating frequency of the first frame 420 is the same as the oscillating frequency of the driving electrode 460.

Furthermore, each of the first springs 450 connects the third proof mass 430 and the first frame 420 along the x-axis. In addition, the third proof mass 430 of the embodiment is a third frame. The first proof mass 410 is located within the third frame. The first proof mass 410 is connected to the third proof mass 430 through the torsional beam 440.

Figure 4:
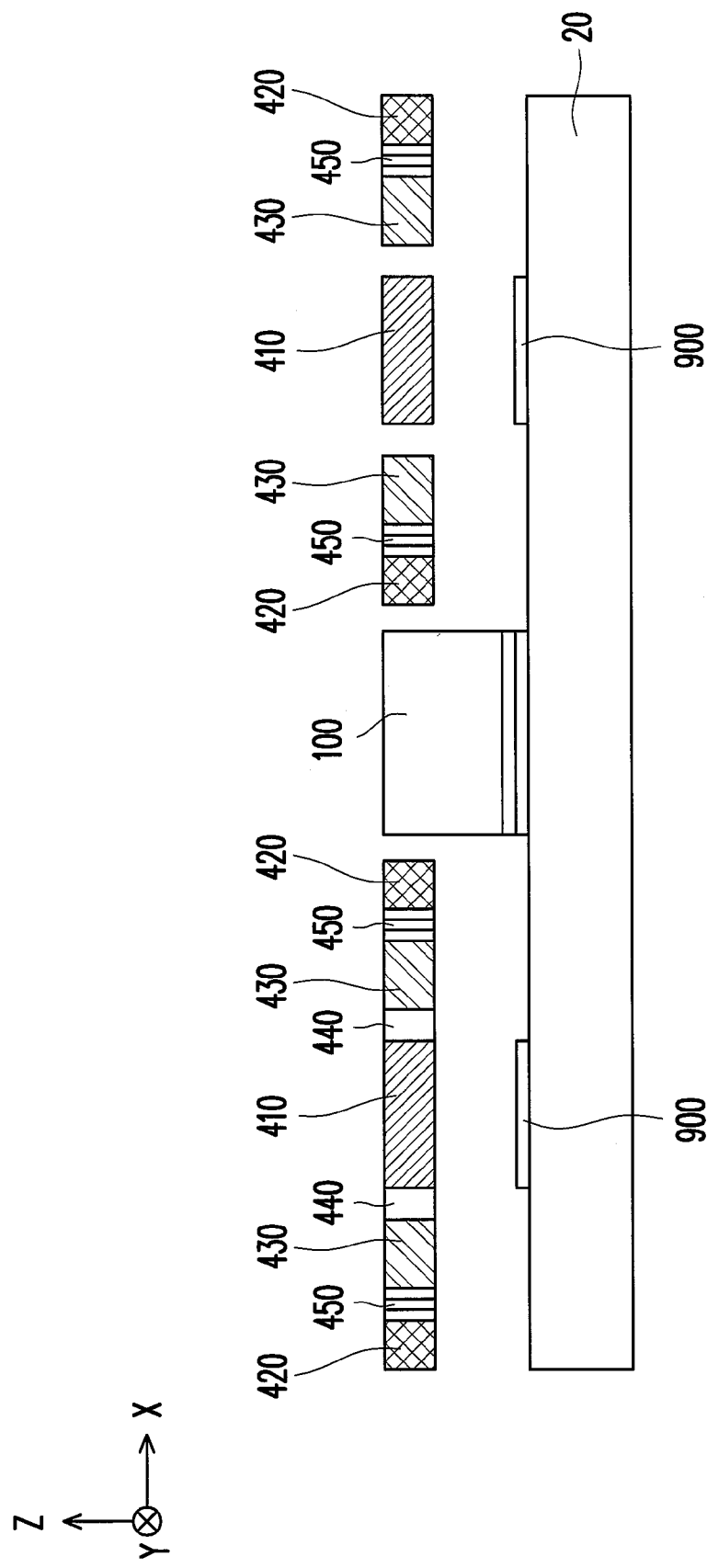
FIG. 4 is a cross-sectional view of the MEMS device of FIG. 2 along the line I-I.

Herein, the torsional beam 440 allows the first proof mass 410 to rotate with the x-axis as the rotation axis. In further detail, FIG. 4 is a cross-sectional view of the MEMS device of FIG. 2 along the line I-I. Referring to FIG. 2 and FIG. 4, the MEMS device 10 with oscillating assemblies further includes a substrate 20 (as shown in FIG. 4) and a plurality of first sensing electrodes 900 disposed on the substrate 20. The first sensing electrodes 900 are formed below the first proof mass 410 through the conductive layer on the substrate 20. When the first proof mass 410 rotates with the x-axis as the rotation axis, the first sensing electrodes 900 can sense the change in capacitance caused by the rotation of the first proof mass 410, and the external angular velocity inputted from the x-axis is calculated further.

In addition, in the embodiment, the torsional beam 440 passes along a non-central axis (eccentric axis) of the first proof mass. In other words, the first proof mass 410 does not rotate about the axis that a center of figure CA is located at. As shown in FIG. 2, since the density distribution of the first proof mass 410 is uniform, the center of figure CA is the location of the center of mass MA. Thus, the aforementioned connection method causes a shift between an eccentric axis B1 of the first proof mass 410 and a central axis C1 that passes through the center of figure CA (and the center of mass MA). In other words, the torsional beam 440 is connected to the first proof mass 410 along the eccentric axis B1. The first proof mass 410 is an unbalanced proof mass, so as to rotate with the x-axis as the rotation axis. This is advantageous in detecting the angular velocity of the x-axis.

Figure 5A:
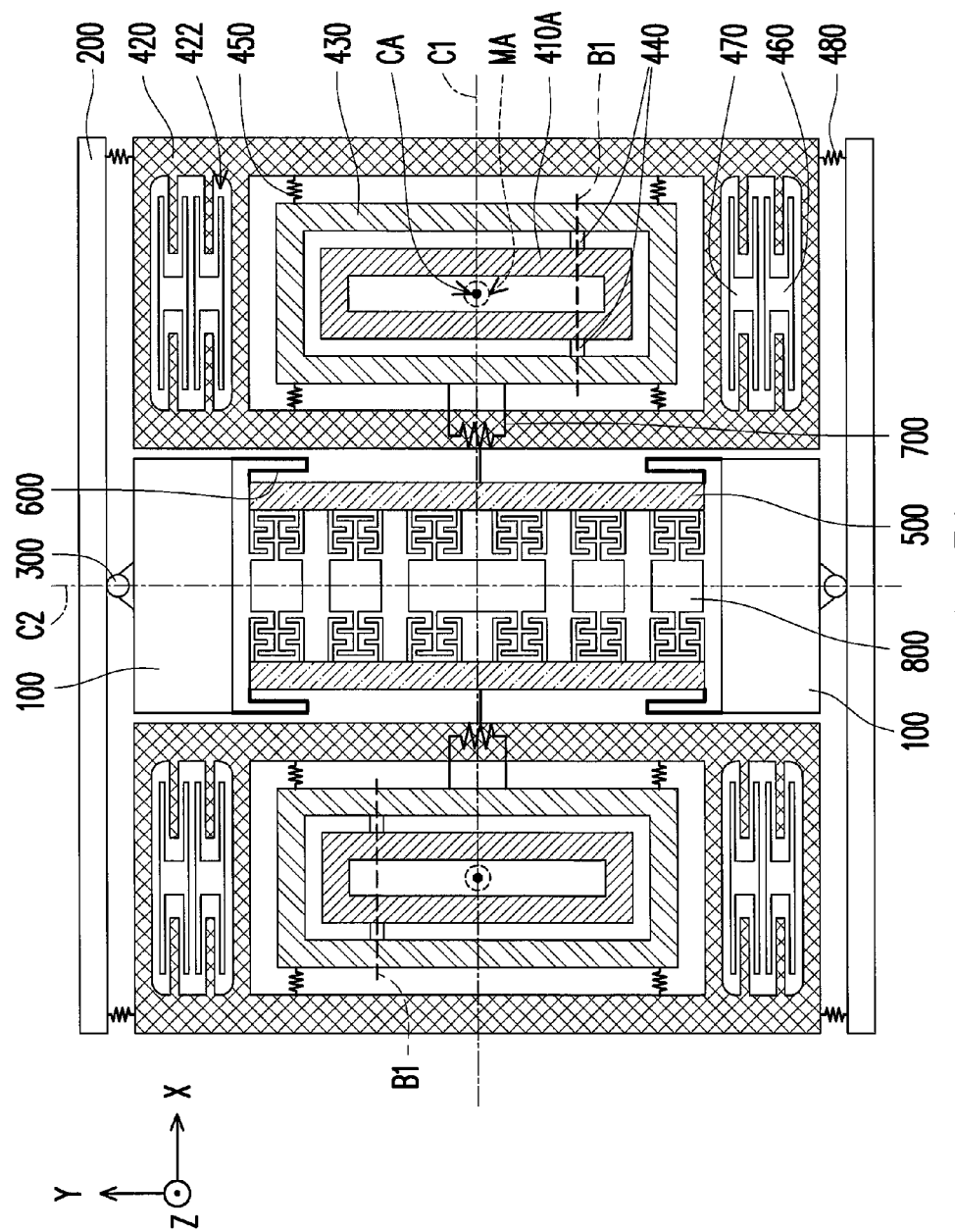
FIG. 5A to FIG. 5C are schematic views of an equivalent system of an MEMS device according to different embodiments, respectively.
Figure 5B:
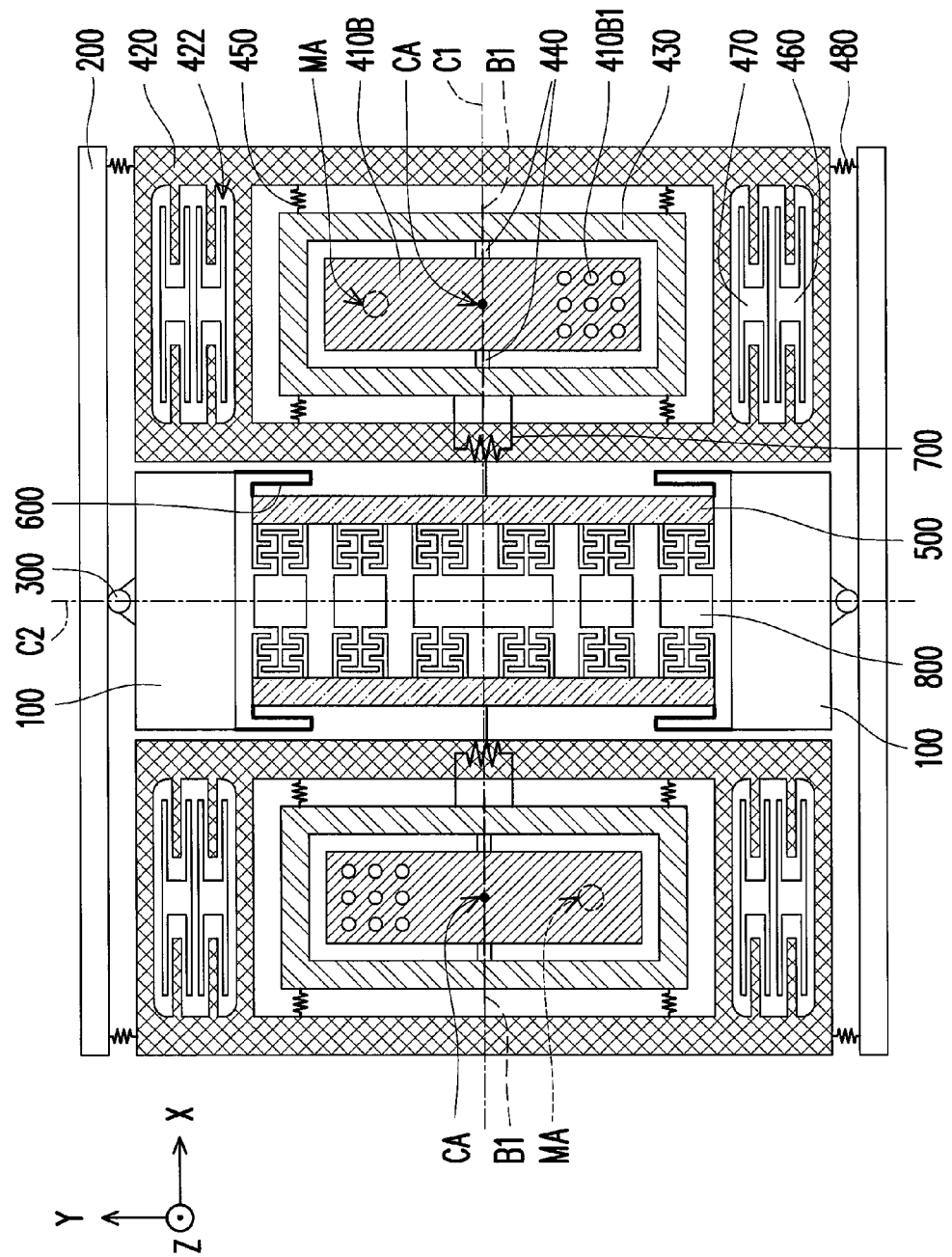
Figure 5C:
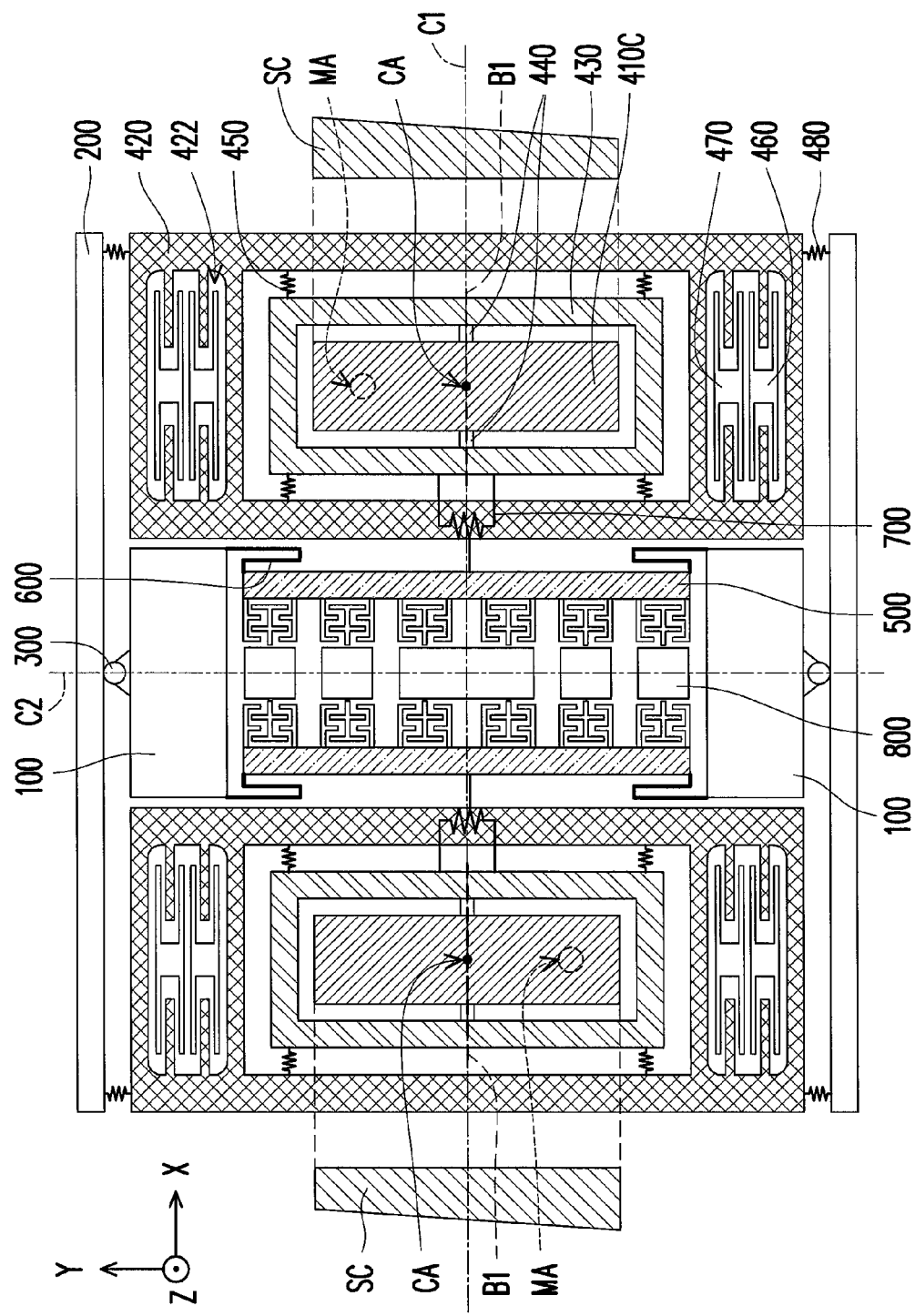

However, the disclosure is not limited thereto. FIG. 5A to FIG. 5C are schematic views of an equivalent system of an MEMS device according to different embodiments, respectively. Referring to FIG. 5A and then compared it to FIG. 2, the connection of the torsional beam 440 and the first proof mass 410, 410A is the same as the embodiment of FIG. 2. The difference is the first proof mass 410A act as a second frame in the embodiment showing in FIG. 2. In other words, when the density of the first proof mass 410 or 410A is uniformly distributed, the connection region of the torsional beam 440 and the first proof mass 410 or 410A is at a non-central region of the first proof mass 410 or 410A. In other words, the torsional beam 440 is connected to the first proof mass 410 along the eccentric axis B1. Thus, the first proof mass 410 becomes an unbalanced proof mass.

Next, please refer to FIG. 5B and compared it to FIG. 2. The difference between this embodiment and the previous embodiment is that the torsional beam 440 is connected to the center axis C1 (i.e. the axis parallel to the x-axis and passing through the center of figure CA) of the first proof mass 410B. The first proof mass 410B includes a plurality of openings 410B1 located on one side which is away from the center of figure CA. This causes the center of mass MA of the first proof mass 410B to shift to another side and away from the openings (comparing to the embodiments without the openings 410B1). Thus, the mass of the first proof mass 410B is not uniformly distributed, and so the first proof mass 410B is an unbalanced proof mass. Finally, please refer to FIG. 5C and compared it to FIG. 2. Similar to the embodiment of FIG. 5B, the torsional beam 440 is connected to the first proof mass 410C along a center axis C1 that the center of figure CA of the first proof mass 410C is located on. However, the first proof mass 410C displays an uneven thickness along the y-axis (the cross-section line block SC shown in FIG. 5C). In other words, the center of mass MA of the first proof mass 410C is located away from the center of axis C1 (i.e. the position of the center of mass MA is different from the position of the center of figure CA). Therefore, the first proof mass 410C is an unbalanced proof mass. Accordingly, any aforementioned or conventional methods that create an unbalanced first proof mass and rotate along the x-axis as the axis of rotation can be applied to this disclosure.

Figure 6A:
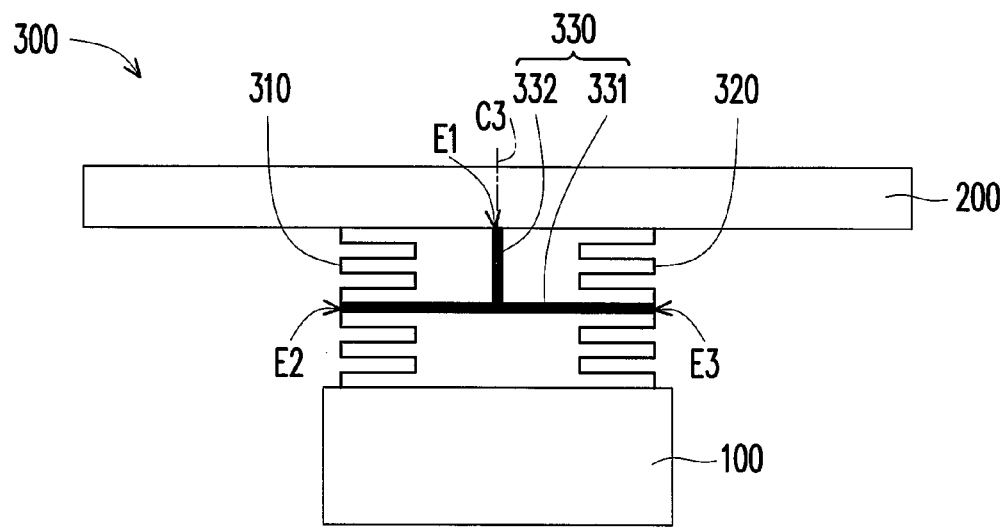
FIG. 6A is an enlarged partial schematic view of the first assembly of springs of the MEMS device of FIG. 1.

FIG. 6A is an enlarged partial schematic view of the first assembly of springs of the MEMS device of FIG. 1. Referring to FIG. 1 and FIG. 6A, in the embodiment, the first assembly of springs 300 includes a plurality of folded springs 310, 320 and a support 330. The folded springs 310, 320 each are connected between the lever 200 and the base 100. The support 330 is located between the folded springs 310, 320, and is surrounded by the folded springs 310, 320, the lever 200, and the base 100. In other words, the support 330 is assembled with a lateral beam 331 and a longitudinal beam 332. One of the ends E1 (i.e. an end of the longitudinal beam 332) of the support 330 is connected at a center of the lever 200. The other two ends E2, E3 (i.e. the two ends of the lateral beam 331) of the support 330 are respectively connected to the folded springs 310, 320 located at the left and right sides of the support 330. In other words, the folded springs 310, 320 are parallel to each other and are located between the lever 200 and the base 100. The frame 330 has a T-shaped profile and is connected to the lever 200 and the folded springs 310, 320 through its ends E1-E3.

It should be further noted that the folded springs 310, 320 (or the folded springs that will be described later) are formed by being repeatedly fold along a specific axis (y-axis in the embodiment). This way, the body can perform vibration along that axis (y-axis). Any elastic member that achieves the same effect can also be applied to the disclosure.

Figure 6B:
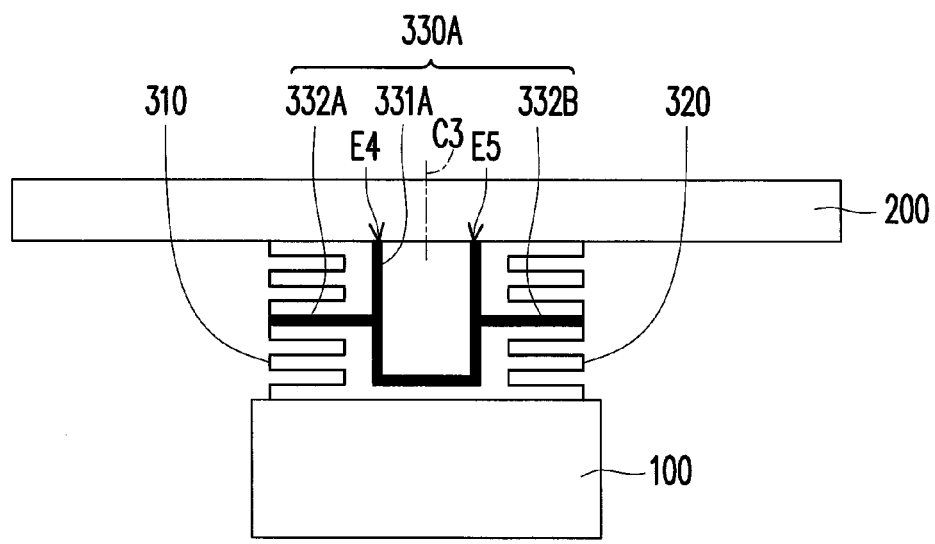
FIG. 6B to FIG. 6E are enlarged partial schematic views of the first assembly of springs according to different embodiments of the disclosure.

However, the disclosure is not limited thereto. FIG. 6B to FIG. 6E are enlarged partial schematic views of the first assembly of springs according to different embodiments of the disclosure. Referring to FIG. 6B, in the embodiment, the support 330A includes a U-shaped beam 331A and two lateral beams 332A, 332B. The U-shaped beam is shaped as a "U" when observed from a top view. Two ends E4, E5 of the U-shaped beam 331A are connected to the lever 200. This way, the center of the lever 200 is between the two ends E4, E5. In further detail, a central axis C3 of the lever 200 passes through the middle of the connections of the two ends E4, E5 of the U-shaped beam 331A. The folded springs 310, 320 are located on the left and right sides of the U-shaped beam 331A. One of the lateral beams 332A is connected between the left outer side of the U-shaped beam 331A and the folded spring 310. The other lateral beam 332B is connected between the right outer side of the U-shaped beam 331A and the folded spring 320.

Figure 6C:
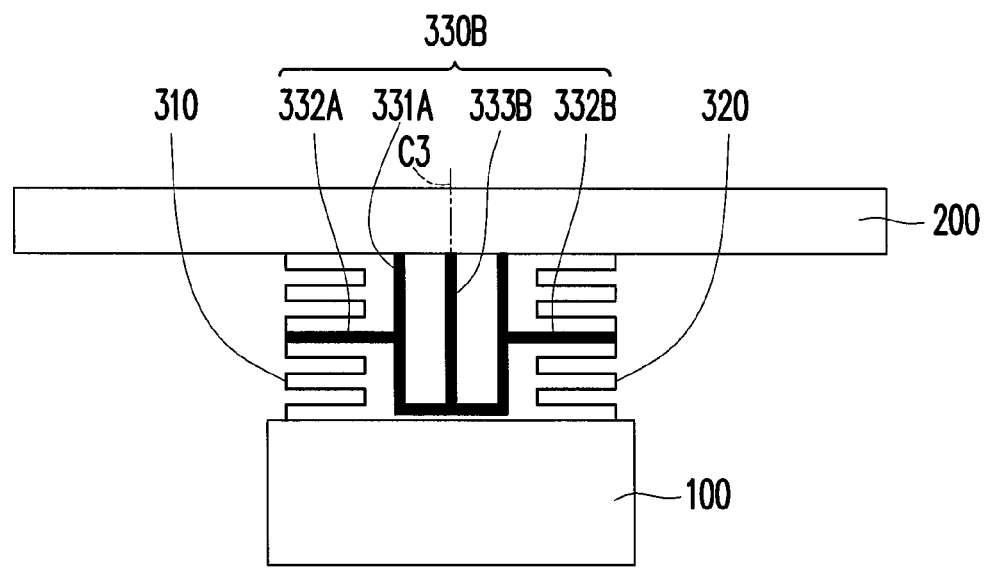

Referring to FIG. 6C and compared it to FIG. 6B, the support 330B further includes a longitudinal beam 333B, connected between the concave portion of the U-shaped beam 331A and the central portion of the lever 200. In further detail, the longitudinal beam 333B is aligned along the central axis C3.

Figure 6D:
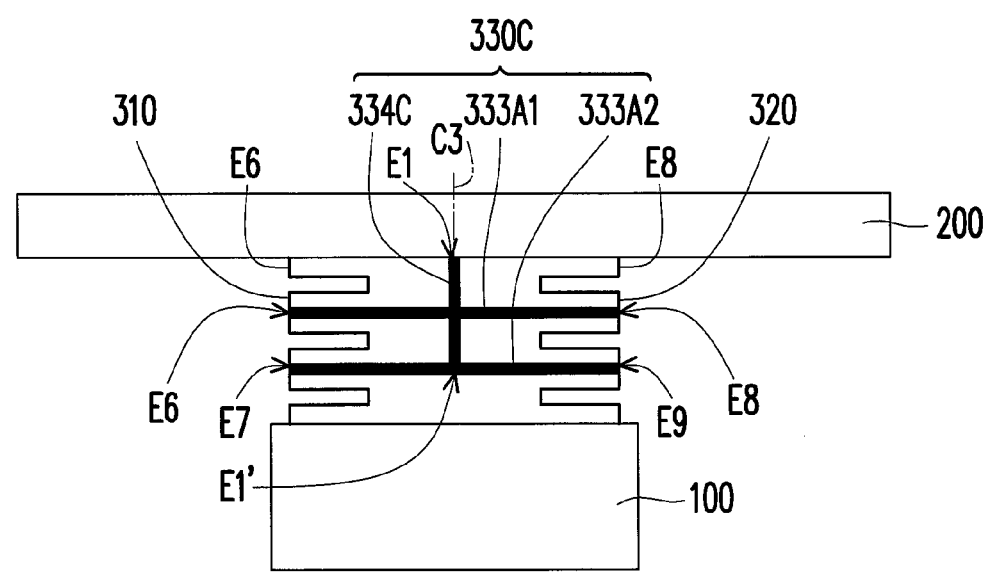

Referring to FIG. 6D and compared it to FIG. 6B, the support 330C is shaped as an underlined plus sign, and is assembled with two lateral beams 333A1, 333A2 and one longitudinal beam 334C. The two corresponding ends E6, E8 of the lateral beam 333A1 are sequentially connected to the folded spring 310 and the folded spring 320 respectively. The two corresponding ends E7, E9 of the lateral beam 333A2 are sequentially connected to the folded spring 310 and the folded spring 320 respectively. The lateral beams 333A1, 333A2 are configured in parallel to each other. An end E1 of the longitudinal beam 334C is connected to the centeral portion of the lever 200. In further detail, the longitudinal beam 334C is aligned along the central axis C3. After the longitudinal beam 334C is connected to the lateral beam 333A1, the other end E1' of the longitudinal beam 334C is connected to the lateral beam 333A2.

Figure 6E:
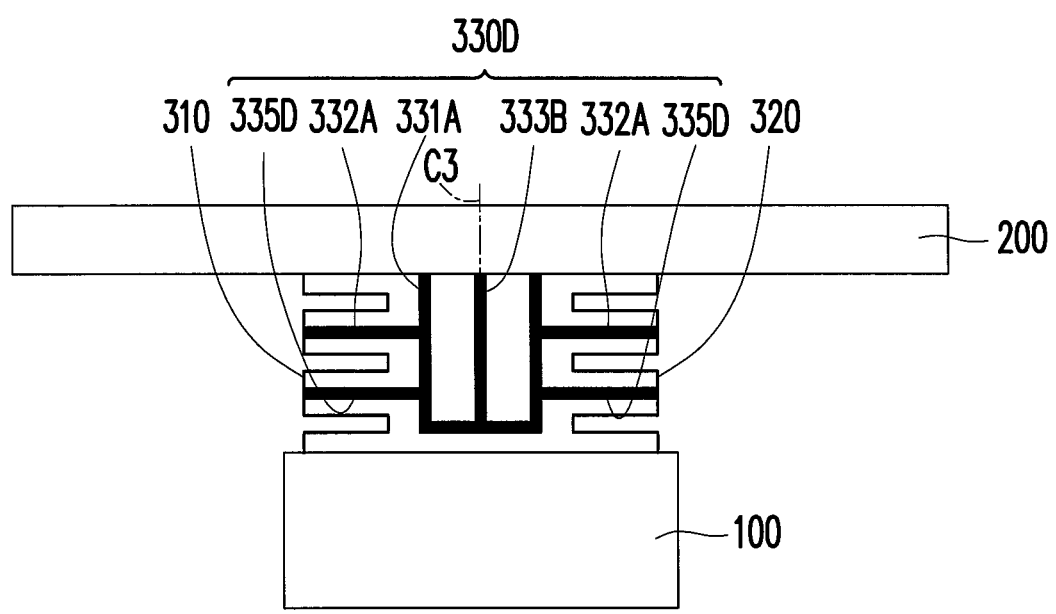

Referring to FIG. 6E and compared it to the embodiment of FIG. 6C, the support 330D further includes two lateral beams 335D, which are respectively connected from the bottom turning portion of the U-shaped support 331A to the corresponding folded springs 310, 320.

It should be further noted that in the above embodiment, two more oscillating units respectively connected to the two ends of the lever 200 can be included. The two oscillating units can be the two oscillating assemblies 400 of FIG. 2. Each oscillating assembly 400 includes a first frame 420, a first proof mass 410, a third proof mass 430, a plurality of torsional beams 440, and a plurality of first springs 450. In addition, the oscillating units can be two identical proof masses.

Figure 6F:
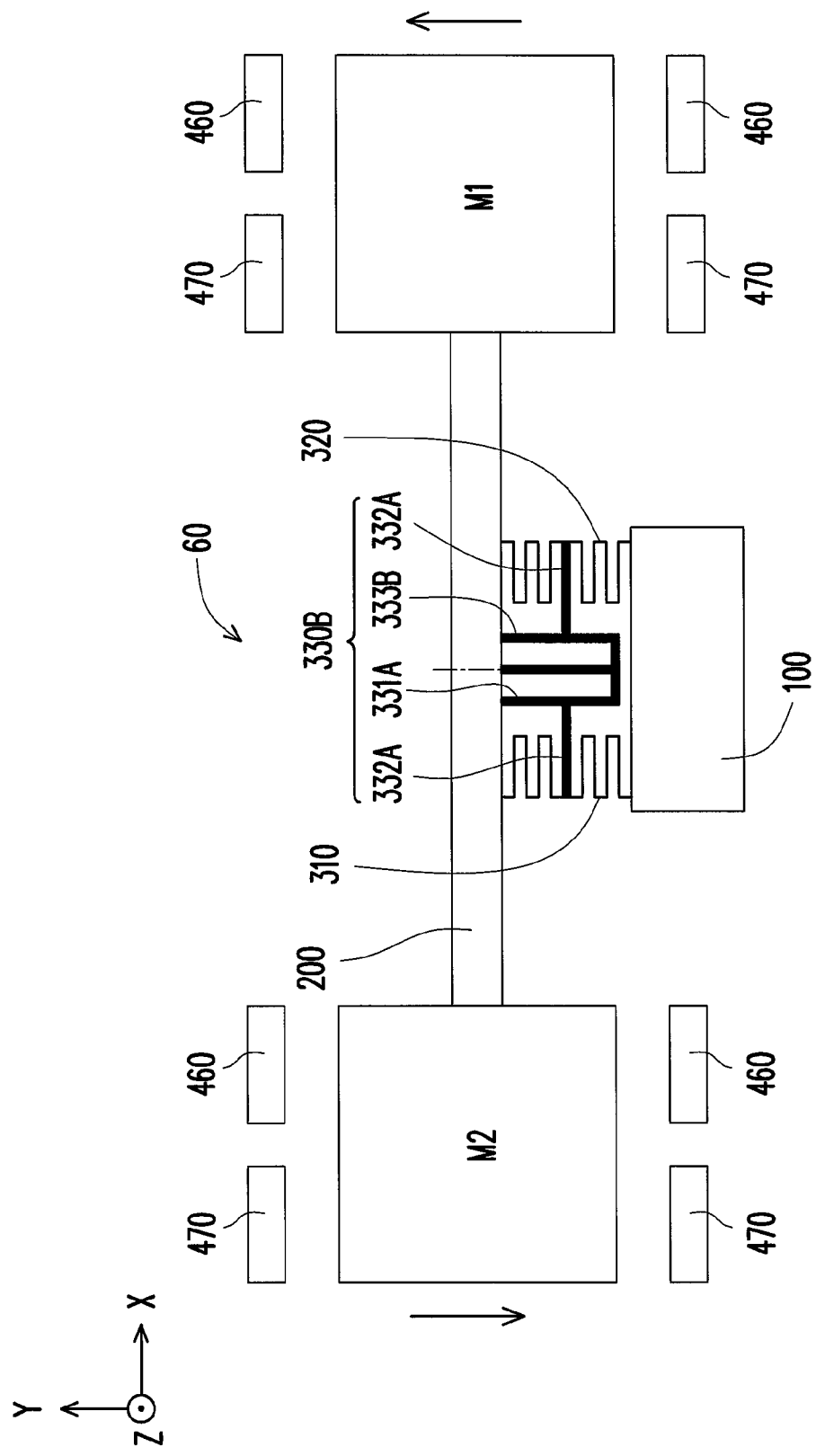
FIG. 6F is a schematic view of an MEMS resonator according to another embodiment of the disclosure.

FIG. 6F is a schematic view of an MEMS resonator according to another embodiment of the disclosure. The MEMS resonator 60 of the embodiment utilizes the first assembly of springs 330B of FIG. 6C. Two ends of the lever 200 are connected to two oscillating units that are two identical proof masses M1, M2 (i.e. M1, M2 have the same characteristics such as shape, dimensions, mass, and density distribution). The driving electrode 460 causes the identical proof masses M1, M2 to generate opposite oscillation. The sensing electrode 470 detects the oscillation frequency created by the masses M1, M2, and sends it to the ASIC.

Figure 6G:
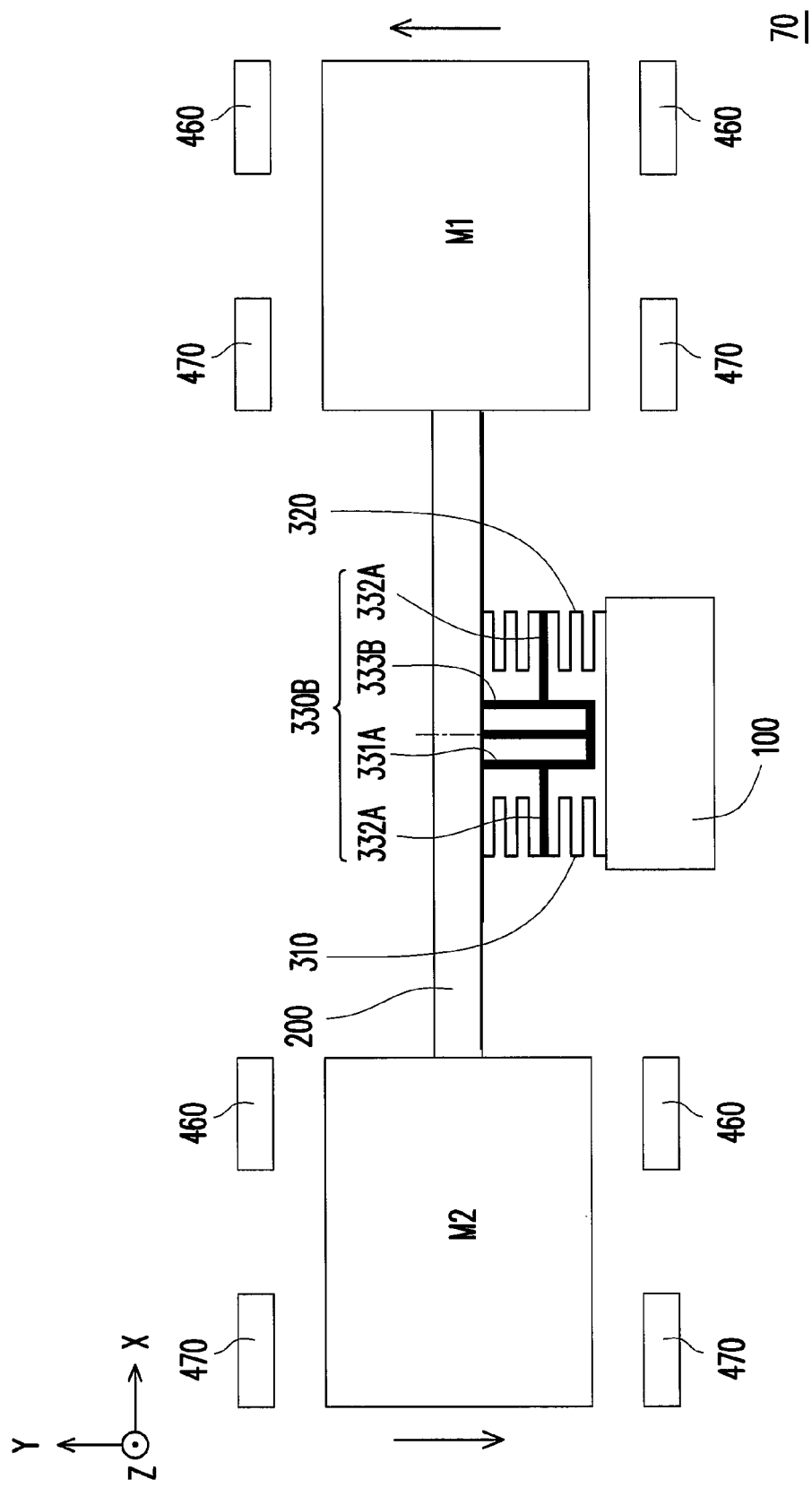
FIG. 6G is a schematic view of an MEMS resonant accelerometer according to another embodiment of the disclosure.

Finally, the ASIC adjusts the frequency of the driving signal continuously, so that through the driving electrode 460, the masses M1, M2 respectively generate a back and forth oscillation at that resonance frequency. FIG. 6G is a schematic view of an MEMS resonant accelerometer according to another embodiment of the disclosure. The embodiment utilizes the first assembly of springs 330B of FIG. 6C. This embodiment is different from the embodiment in FIG. 6F. At the beginning, the identical proof masses M1, M2 of the MEMS resonant accelerometer 70 achieves the resonance frequency in a back and forth oscillation state. When an acceleration of the z-axis is generated externally, the lever 200 will deform in the z-axis and cause the stiffness along the z-axis to be changed. This causes the resonance frequency of the proof masses to be shifted. Therefore, the acceleration of the z-axis can be calculated by detecting the shift in the resonance frequency.

The aforementioned only includes the first assembly of springs 300 for clear description of the embodiments. However, any configuration of elastic members (including the folded springs 310, 320), bases, and supports, that can cause each elastic member to connect with the lever and the base, and cause the support to connect the lever and the elastic member, further causing the lever 200 to control the moving direction of the oscillating units through its fulcrum, can apply to the disclosure.

Referring to FIG. 1 and FIG. 2, the MEMS device 10 with oscillating assemblies further includes a plurality of fixed electrodes 800. The fixed electrodes 800 are arranged along the y-axis between the two levers 200, and are located on a mirror axis C2 of the two oscillating assemblies 400 (herein, the mirror axis C2 is parallel to the y-axis). The movable electrodes 500 are disposed at the two opposite sides of the fixed electrodes 800. Each of the movable electrodes 500 are connected to the base 100 by the restraining springs 600. It should be noted that the restraining springs 600 are disposed along the x-axis, and deforms along the x-axis. This means that the y-axis stiffness of the restraining springs 600, or the stiffness along the y-axis is greater than the x-axis stiffness of the restraining springs 600, or the stiffness along the x-axis. Thus, the movable electrodes 500 are restrained by the restraining springs 600 and can only move along the x-axis.

In addition, since the movable electrodes 500 of the MEMS device 10 with oscillating assemblies of the embodiment are symmetrically disposed corresponding to the fixed electrodes 800, a first proof mass 410 of each oscillating assembly 400 of the MEMS device 10 with oscillating assemblies all use the same group of fixed electrodes 800. Hence, the whole volume of the device can be decreased effectively. In other words, the two proof masses 410 of the embodiment both use the same group of fixed electrodes 800.

FIG. 7A to FIG. 7L are enlarged partial schematic views of the second assembly of springs of the MEMS device of FIG. 1 according to different embodiments. In these embodiments, each of the second assemblies of springs 700, 700B, 700C, 700D, 700E, 700F, 700G, 700H, 700I, 700J, and 700K, traverses the first frame 420 by adopting a method of passing over the first frame 420. In other words, the first frame 420 of the oscillating assemblies 400 does not include any opening.

The method of the second assemblies of springs 700 traversing the first frame 420 adopts the method of passing over the first frame 420 from the top.

Figure 7A:
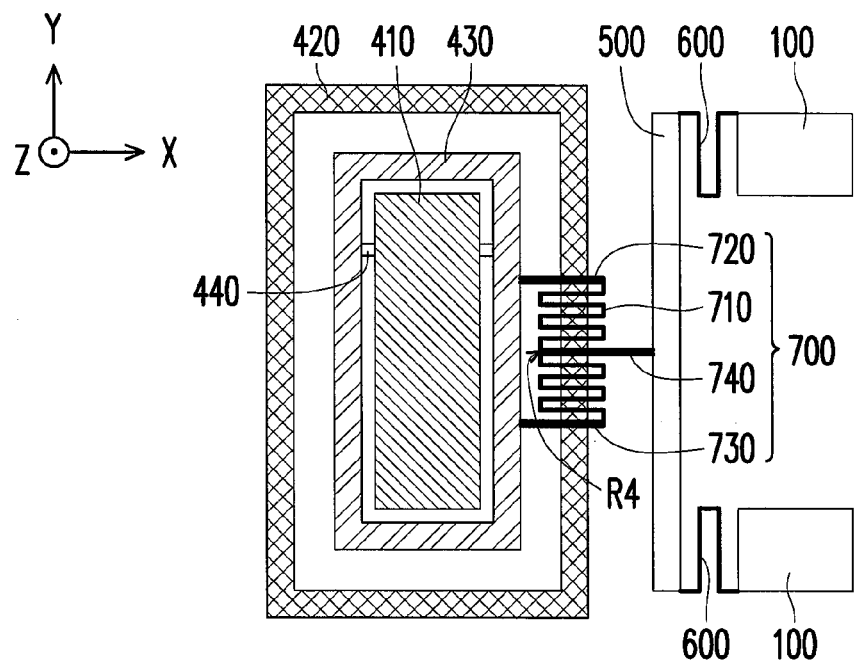
FIG. 7A is an enlarged partial schematic view of the second assembly of springs of the MEMS device of FIG. 1.

FIG. 7A is an enlarged partial schematic view of the second assembly of springs of the MEMS device of FIG. 1. Referring to FIG. 1 and FIG. 7A, in the embodiment, the second assembly of springs 700 includes a fourth spring 710, and a plurality of movable linkages. The movable linkages include first linkages 720, 730, and a second linkage 740. The fourth spring 710 is, for example, a folded spring disposed along the y-axis, and deforms along the y-axis. The first linkages 720, 730, and the second linkage 740 extend in parallel to the x-axis. In other words, a moving direction of the first linkages 720, 730 and a moving direction of the second linkage 740 are perpendicular to the disposing direction of the fourth spring 710 as well as the disposing direction of the movable electrode 500 (in the embodiment, the fourth spring 710 is disposed along the y-axis, and the movable electrode 500 is also disposed along the y-axis). The first linkages 720, 730 are respectively connected to an end of the fourth spring 710 and the third proof mass 430. The second linkage 740 connects the central portion of the fourth spring 710 and the movable electrode 500. In this embodiment, an end of the second linkage 740 is connected to a transition region R4 which is located at the central portion of the fourth spring 710 and is closer to the third proof mass 430. It means that the distance from third proof mass 430 to the transition region R4 is shorter than that from movable electrode 500 to the transition region R4. Another end of the second linkage 740 traverses the first frame 420 and is connected to the movable electrode 500. In other words, the fourth spring 710 can be disposed directly above the first frame 420 (FIG. 1 shows the fourth spring 710 passing through the first frame 420), so that the first linkages 720, 730, and the second linkage 740 can traverse (pass over) the first frame 420.

Accordingly, if an external angular velocity (angular rare) $W_z$ along the z-axis is generated while the third proof mass 430 oscillates along the y-axis, the third proof mass 430 will generate displacement along the x-axis. Through the configuration of the restraining springs 600 and the fourth spring 710 which will deform along the y-axis. Thus, when the third proof mass 430 oscillates along the y-axis, the displacement of the movable electrode 500 along the y-axis is reduced. This causes the movement effect of the third proof mass 430 oscillating along the x-axis to be transferred to the movable electrode 500 (i.e. the configuration of the springs 710, 600 allows the third proof mass 430 to drive the movable electrode 500 to oscillate along the x-axis). Through the displacement of the movable electrode 500 along the x-axis, the capacitance varies between the movable electrode 500 and the fixed electrode 800. This way, the angular velocity of the z-axis can be calculated.

Figure 7B:
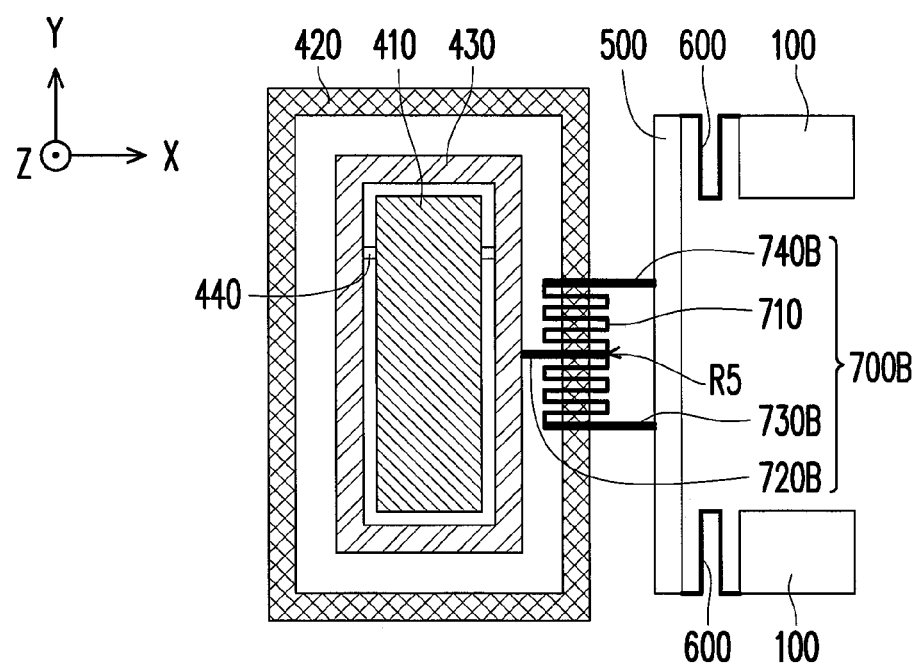
FIG. 7B to FIG. 7J are schematic views of the fourth spring and the movable linkages according to different embodiments, respectively.

The disclosure does not limit the configuration of the fourth spring and the movable linkages. From FIG. 7B to FIG. 7J are schematic views of the fourth spring and the movable linkage according to different embodiments, respectively. Referring to FIG. 7B, the movable linkages of the second assembly of springs 700B includes the first linkages 730B, 740B, and a second linkage 720B. The configuration of the linkages is symmetrically opposite to the configuration of the embodiment of FIG. 7A. In other words, the movable linkages of the embodiment are configured so that. The second linkage 720B connects the central portion of the fourth spring 710 and the third proof mass 430. In this embodiment, an end of the second linkage 720B is connected to a transition region R5 which is located at the central portion of the fourth spring 710 and is closer to the movable electrode 500. It means that the distance from third proof mass 430 to the transition region R5 is longer than that from movable electrode 500 to the transition region R5. A first linkage 730B connects an end of the fourth spring 710 and a portion of the movable electrode 500. The other first linkage 740B connects the other end of the fourth spring 710 and another portion of the movable electrode 500.

Figure 7C:
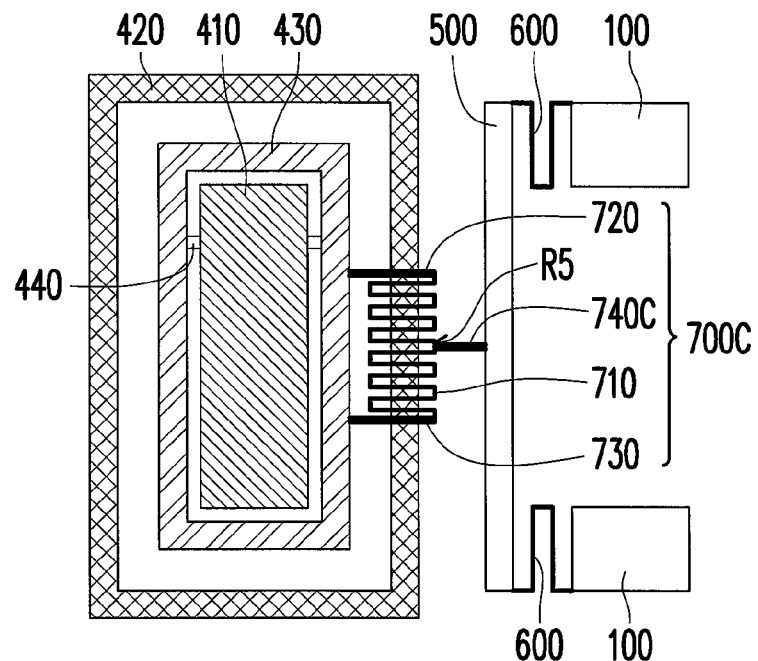
Figure 7D:
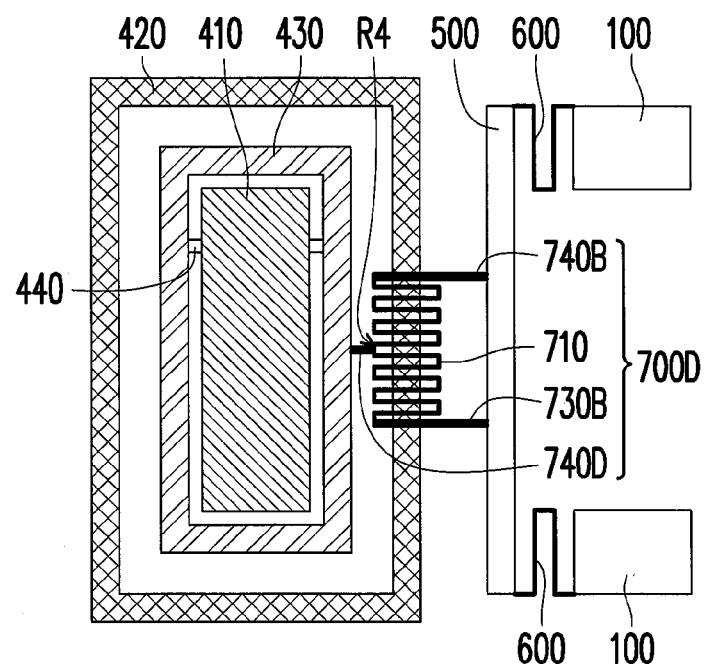

Referring to FIG. 7C, in the embodiment, the movable linkages of the second assembly of springs 700C includes first linkages 720, 730, and a second linkage 740C. The difference in this embodiment and the embodiment of FIG. 7A is that the second linkage 740C connects the central portion of the fourth spring 710 and the movable electrode 500. In the embodiment, an end of the second linkage 740C connects the transition region R5 which is located at the central portion of the fourth spring 710 and is closer to the movable electrode 500. On the other hand, FIG. 7D shows an embodiment that is symmetrically opposite to part of the configuration of the first frame 420 of FIG. 7C. In the embodiment, the movable linkages of the second assembly of springs 700 include first linkages 730B, 740B, and a second linkage 740D. The first linkages 730B, 740B are the same as the embodiment of FIG. 7B, and connect an end of the fourth spring 710 and the movable electrode 500 respectively. The second linkage 740D connects the central portion of the fourth spring 710 and third proof mass 430. In the embodiment, an end of the second linkage 740D connects the transition region R4 which is located at the central portion of the fourth spring 710 and is closer to the third proof mass 430.

Figure 7E:
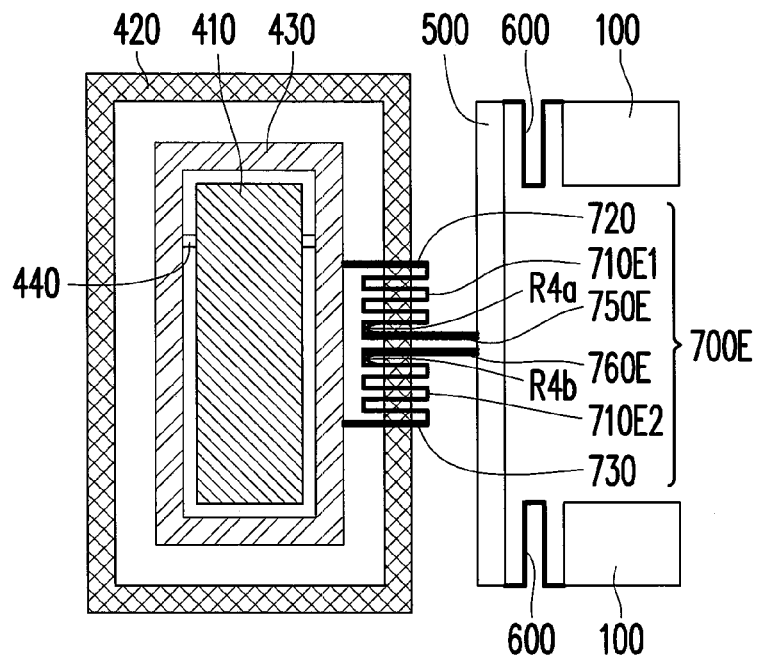
Figure 7F:
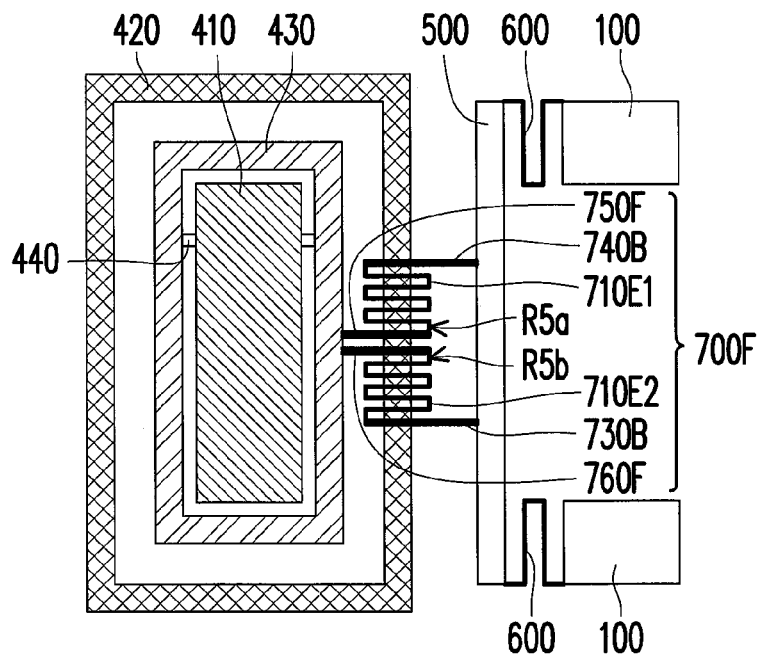

Referring to FIG. 7E, in the embodiment, the movable linkages of the second assembly of springs 700E includes first linkages 720, 730, and second linkages 750E, 760E. Comparing to FIG. 7A, the two second linkages 750E and 760E of FIG. 7E connect the fourth spring 710 and the movable electrode 500 respectively. In detail, the two ends of one of the fourth springs 710E1 respectively connect the first linkage 720 and the second linkage 750E. The other fourth spring 710E2 is connected between the second linkage 760E and the first linkage 730. Furthermore, the two second linkages 750E, 760E are substantially connected at the transition regions R4a and R4b, where the fourth spring 710 is closer to the third proof mass 430, and they are parallel to each other. On the other hand, the configuration of FIG. 7F is symmetrically opposite to FIG. 7E. In the embodiment, the movable linkages of the second assembly of springs 700F includes the first linkages 730B and 740B, and the second linkages 750F and 760F. The first linkages 730B and 740B are similar to FIG. 7B and FIG. 7D, and will not be repeated herein. The second linkages 750F, 760F connect the third proof mass 430 and the transition regions R5a, R5b of the fourth springs 710E1, 710E2, where the fourth springs 710E1, 710E2 are closer to the movable electrode 500.

Figure 7G:
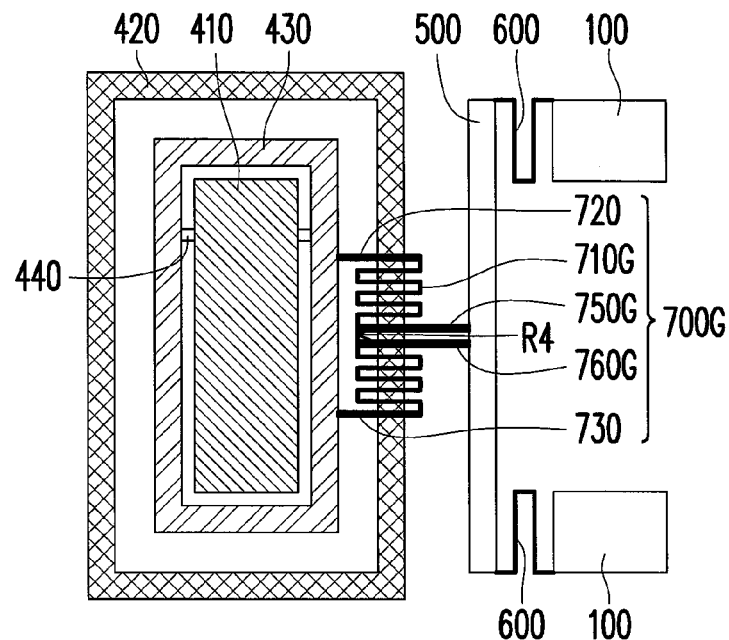

Referring to FIG. 7G, in the embodiment, the movable linkages of the second assembly of springs 700G includes the first linkages 720, 730, and the second linkages 750G, 760G. The first linkages 720, 730 are similar to FIG. 7A, FIG. 7C, and FIG. 7E. The second linkages 750G, 760G connect the movable electrode with the fourth spring 710G. The second linkages 750G, 760G both connect the transition region R4 which is located at the central portion of the fourth spring 710G and is closer to the third proof mass 430. Furthermore, the first linkages 720, 730, and the second linkages 750G, 760G of the embodiment are configured to traverse (pass over) the first frame 420.

Figure 7H:
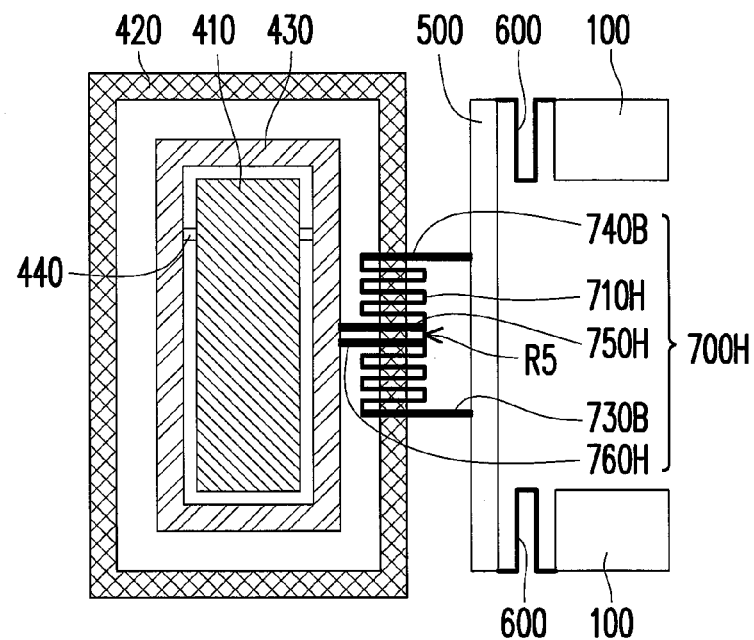

Referring to FIG. 7H, in the embodiment, the movable linkages of the second assembly of springs 700H includes the first linkages 730B and 740B, and the second linkages 750H and 760H. The first linkages 730B and 740B are identical to the ones described in FIG. 7B, FIG. 7D, and FIG. 7F. The second linkages 750H, 760H connect the third proof mass 430 the transition region R5 which is located at the central portion of the fourth spring 710H and is closer to the movable electrode 500. Furthermore, the first linkages 730B, 740B, and the second linkages 750H, 760H of the embodiment are configured to traverse (pass over) the first frame 420.

Figure 7I:
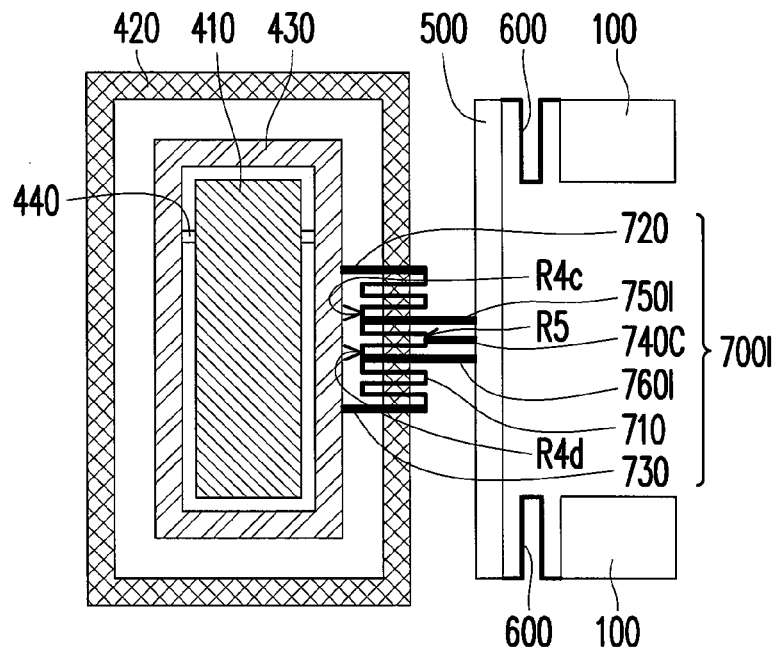

Referring to FIG. 7I, in the embodiment, the movable linkages of the second assembly of springs 700I includes the first linkages 720, 730, and the second linkages 740C, 750I, and 760I. The first linkages 720, 730 are identical to the one described in FIG. 7A, FIG. 7C, and FIG. 7E. The second linkages 750I, 760I respectively connect the movable electrode 500 and the transition regions R4c, R4d of the fourth spring 710H which are located at the central portion of the fourth spring 710H and are closer to the third proof mass 430. Herein, the second linkage 740C is the same as the one described in FIG. 7C.

Figure 7J:
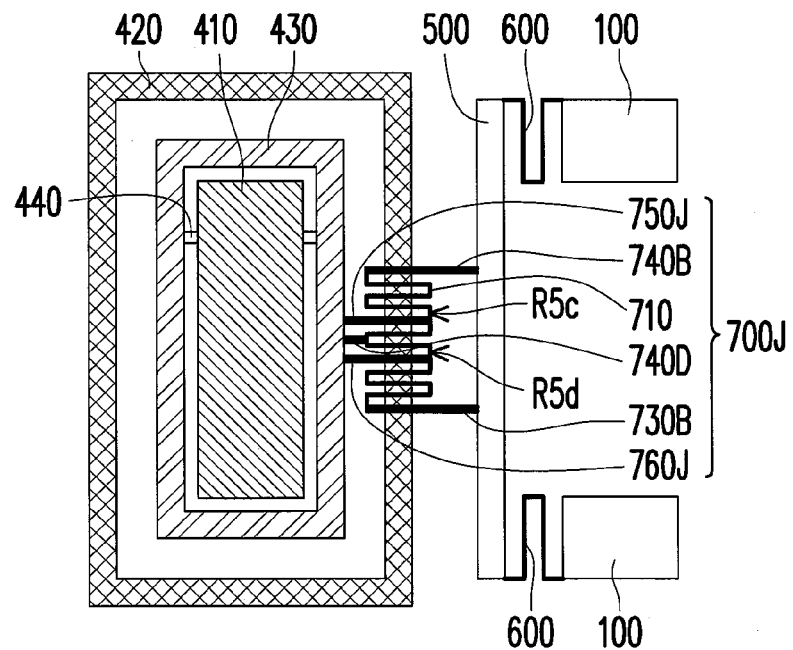

Referring to FIG. 7J, in the embodiment, the movable linkages of the second assembly of springs 700J includes the first linkages 730B and 740B, and the second linkages 740D, 750J, and 760J. The first linkages 730B and 740B are identical to the one described in the embodiments of FIG. 7B, FIG. 7D, FIG. 7F, and FIG. 7H. The second linkage 740D is the same as the one described in FIG. 7D. The second linkages 750J, 760J respectively connect the third proof mass 430 and the transition regions R5c, R5d which are located at the central portion of the fourth spring 710 and are closer to the movable electrode 500. Furthermore, the first linkages 730B, 740B, and the second linkages 750J, 760J of the embodiment are configured to traverse (pass over) the first frame 420.

Figure 7K:
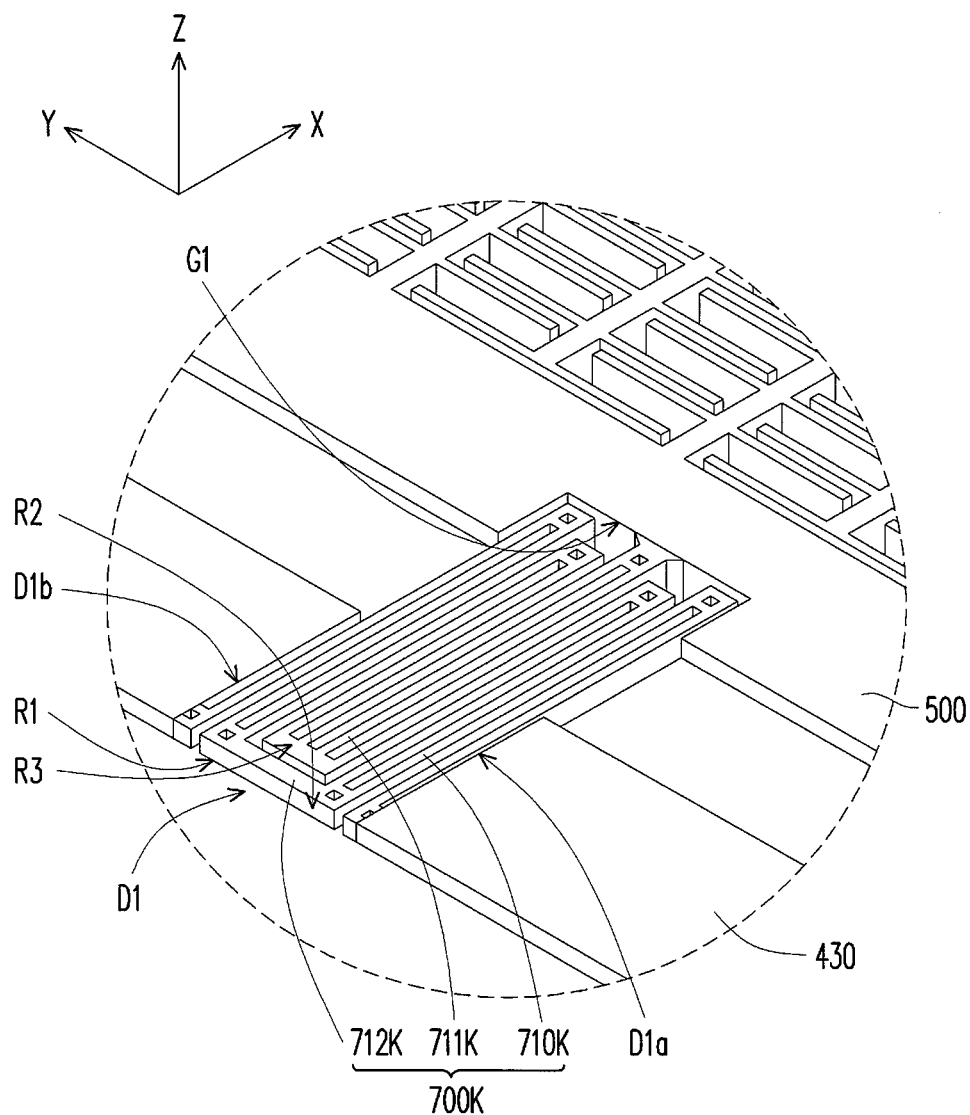
FIG. 7K is an enlarged partial schematic view of the second assembly of springs of the MEMS device according to another embodiment of the disclosure.
Figure 7L:
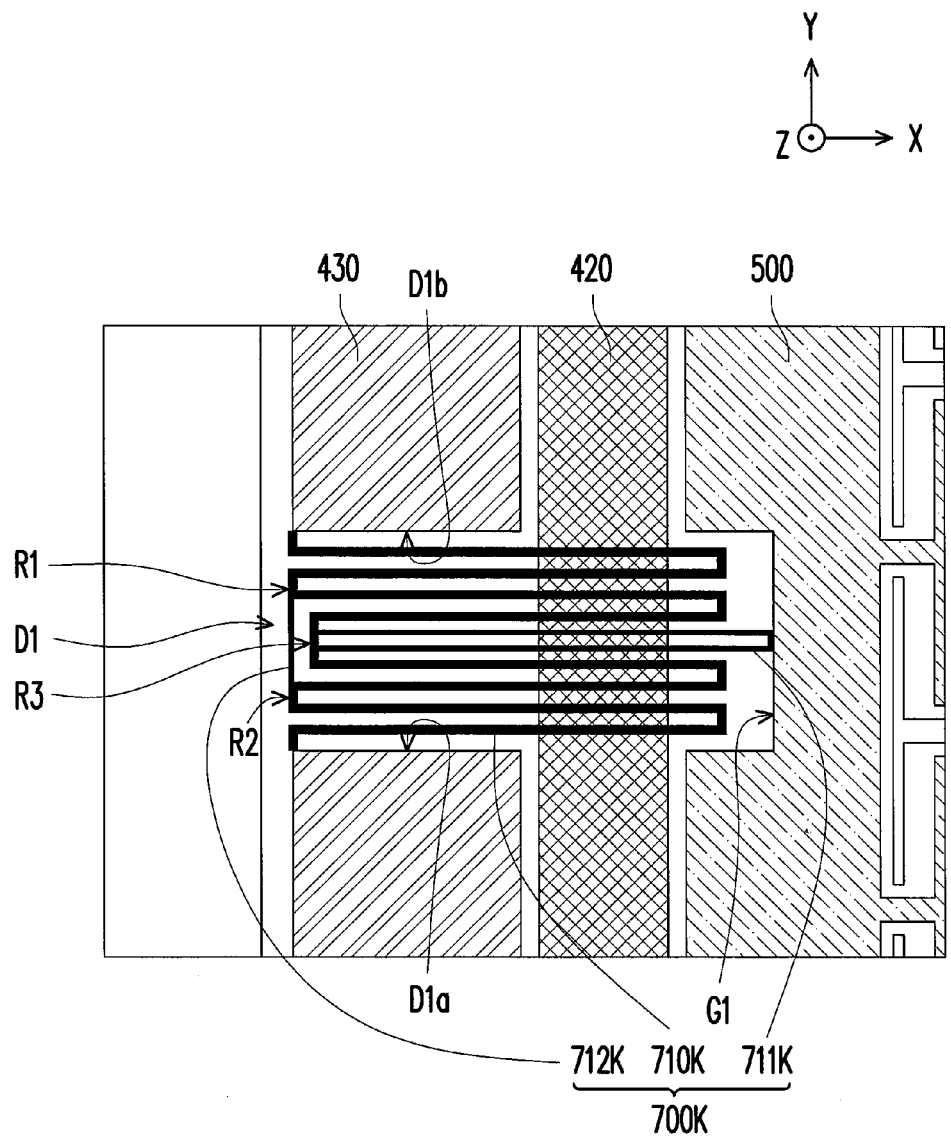
FIG. 7L is a schematic top view of the second assembly of springs of FIG. 7K.

FIG. 7K is an enlarged partial schematic view of the second assembly of springs of the MEMS device according to another embodiment of the disclosure. FIG. 7L is a schematic top view of the second assembly of springs of FIG. 7K. The bold lines of FIG. 7L show the contour of the second assembly of springs. Referring to FIG. 7K and FIG. 7L, in the embodiment, the third proof mass 430 is a third frame that includes an opening D1. The opening D1 separates the third proof mass 430 to two portions. The movable electrode 500 includes a notch G1 corresponding to the opening D1 (herein, this means the notch G1 faces the opening D1). The second assembly of springs 700K includes a fourth spring 710K and a movable linkage 711K. The fourth spring 710K is disposed along the y-axis, and the two ends of the fourth spring 710K are respectively connected at the two ends D1a and D1b of the opening D1 of the proof mass 430 (i.e. the third proof mass 430 has been separated to two portions). An end of the movable linkage 711K is connected to the central portion of the fourth spring 710K, and the other end is connected to the notch G1 of the movable electrode 500.

In other words, the movable linkage 711K extends in an x-axis and connects the fourth spring 710K and the movable electrode 500. The movable linkage 711K is perpendicular to the disposing direction of the fourth spring 710K (disposing along the y-axis) as well as the extending direction of the movable electrode 500 (extending along the y-axis).

In addition, the second assembly of springs 700K further includes a support linkage 712K. The fourth spring 710K includes a central transition region R3 and two transition regions R1, R2. The two transition region R1, R2 are located along the y-axis respectively and on the opposite sides of the central transition region R3 symmetrically, The support linkage 712K connects the two transition regions R1, R2 of the fourth spring 710K along the y-axis. Herein, the support linkage 712K is used to prevent the fourth spring 710K from moving towards the central transition region R3 when the fourth spring 710K is pushing the movable electrode 500. This way, the second assembly of springs 700K increases the displacement of the movable electrode along the x-axis.

The aforementioned structure included the second assembly of springs for simplifier description of the embodiments. For the MEMS device to restrain the moving direction of the electrode by the second assembly of springs described in the aforementioned embodiments, the embodiments can include any restraining springs connecting the movable electrode with the base, any second assembly of springs that traversing the first frame and connecting the third proof mass with the movable electrode, and any movable linkages that connect to the fourth spring. All of which can be applied to the disclosure.

Figure 8A:
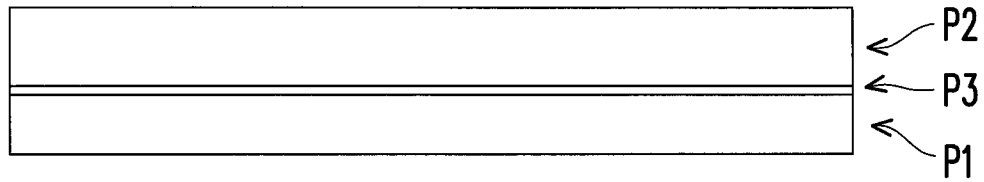
FIG. 8A to FIG. 8H schematically illustrate the steps for fabricating an MEMS device according to an embodiment of the disclosure.
Figure 8B:
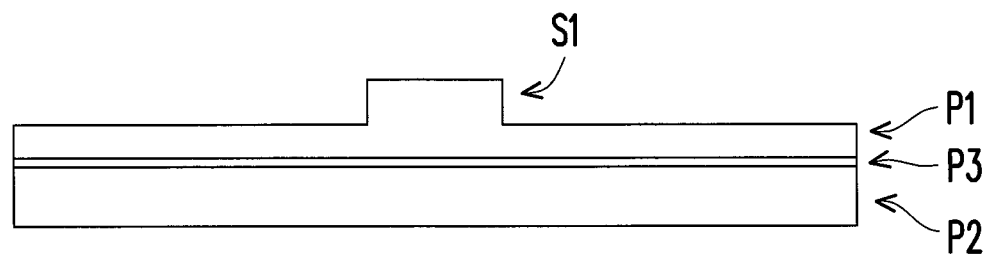
Figure 8C:
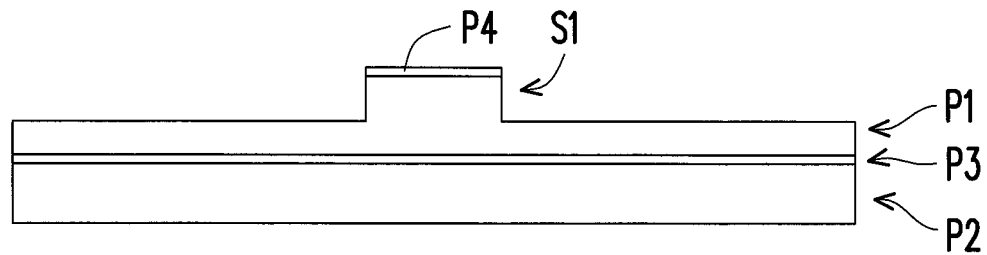

FIG. 8A to FIG. 8H depict the fabrication process of the MEMS device according to an embodiment (the embodiment of FIG. 1) of the disclosure. Referring to FIG. 8A through FIG. 8C, a silicon on insulator wafer (SOI wafer) is provided. The SOI wafer includes a device layer P1, a handle layer P2, and an $SiO_2$ layer P3 which is clamped between the device layer P1 and the handle layer P2.

Next, a pedestal S1 is etched from the device layer P1, and a composite metal layer P4 is deposited on the pedestal S1 to form a contact point for electrical connection.

Figure 8D:
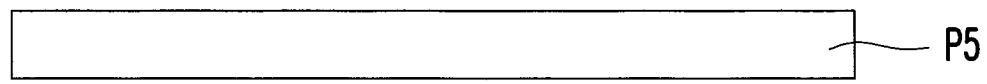
Figure 8E:
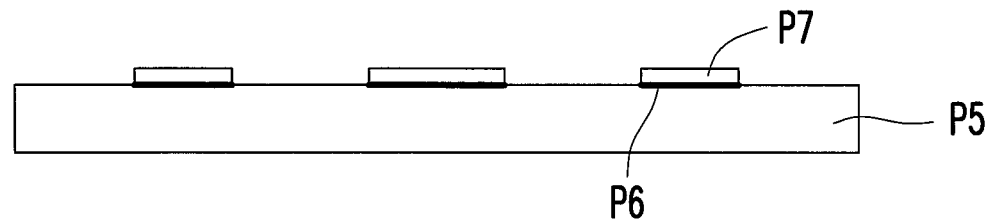

Referring to FIG. 8D and FIG. 8E, using a soda glass, such as Pyrex (registered trademark), as a substrate wafer P5. Then a first metal layer P6 used for a metal trace and capacitor plate is deposited on the substrate wafer P5. Next, a second metal layer P7 is deposited on the top of the first metal layer P6 as a conductive bonding pad. The embodiment uses chromium (Cr)/platinum (Pt) composite metals as the metaltrace.

Figure 8F:
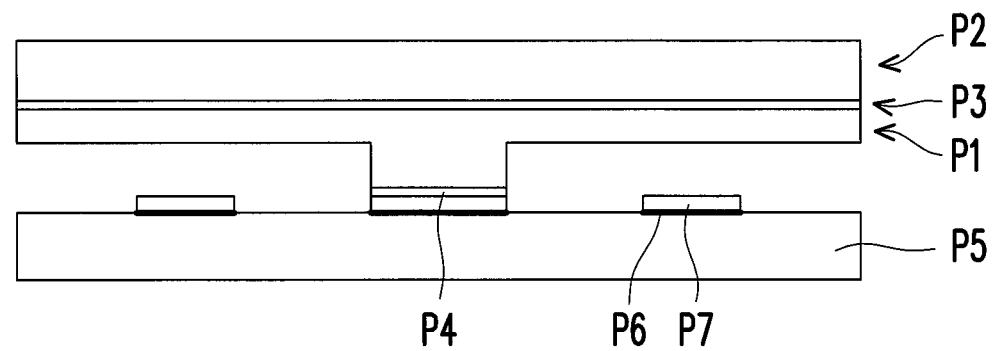

Referring to FIG. 8F, after the SOI wafer fabrication process (FIG. 8A to FIG. 8C) and the glass wafer fabrication process (FIG. 8D, FIG. 8E) are finished, a wafer to wafer anodic bonding manufacture under a vacuum environment, 400 V bias voltage, and 420° C. is performed to bond two wafers together.

Figure 8G:
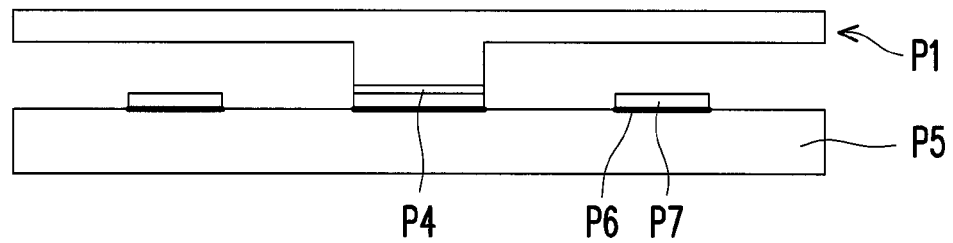
Figure 8H:
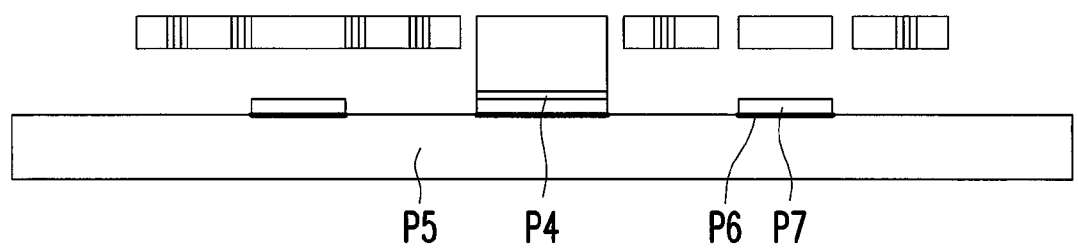
Figure 9:
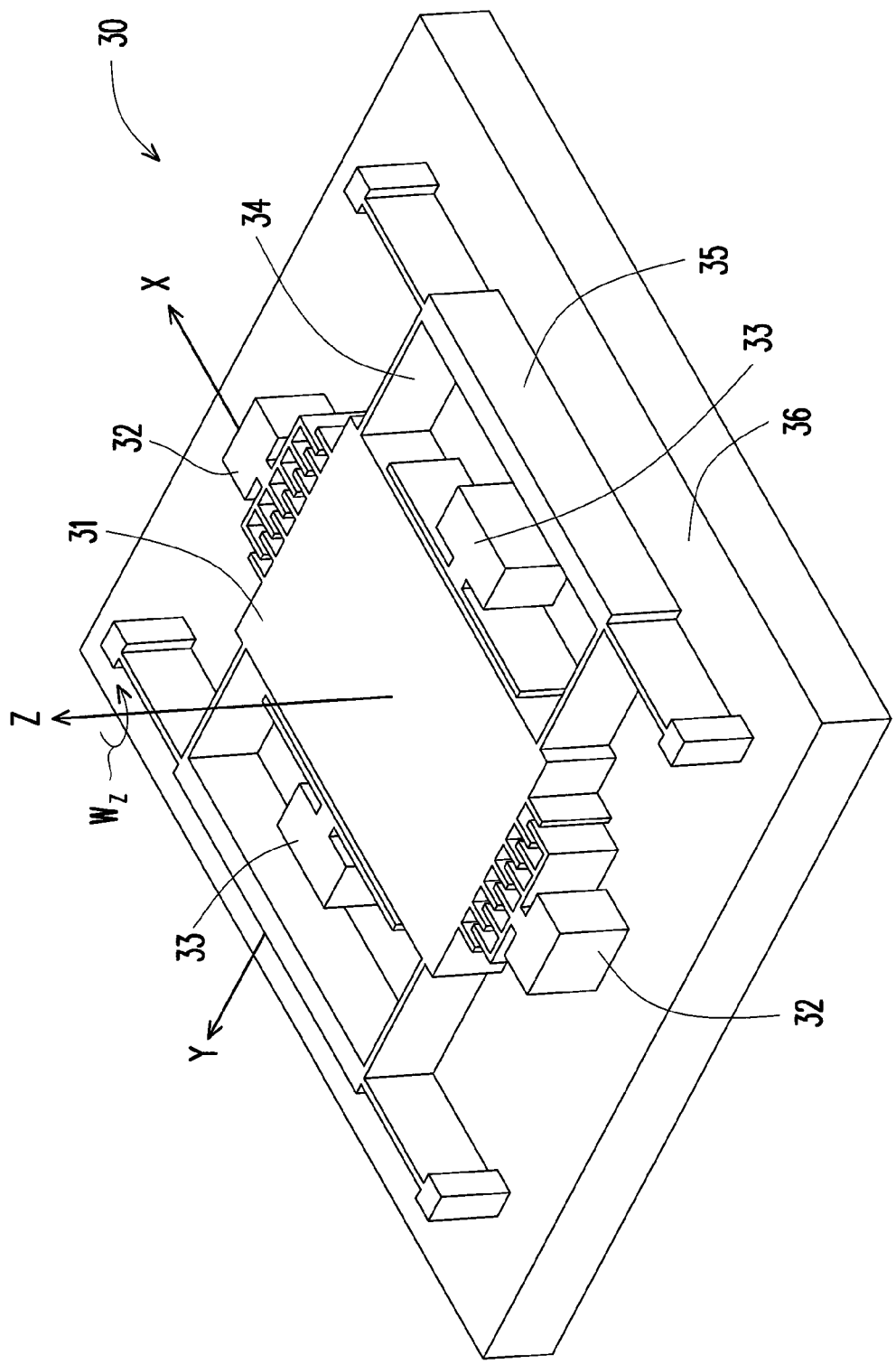
FIG. 9 is a schematic structural view of a conventional MEMS gyroscope.
Figure 10A:
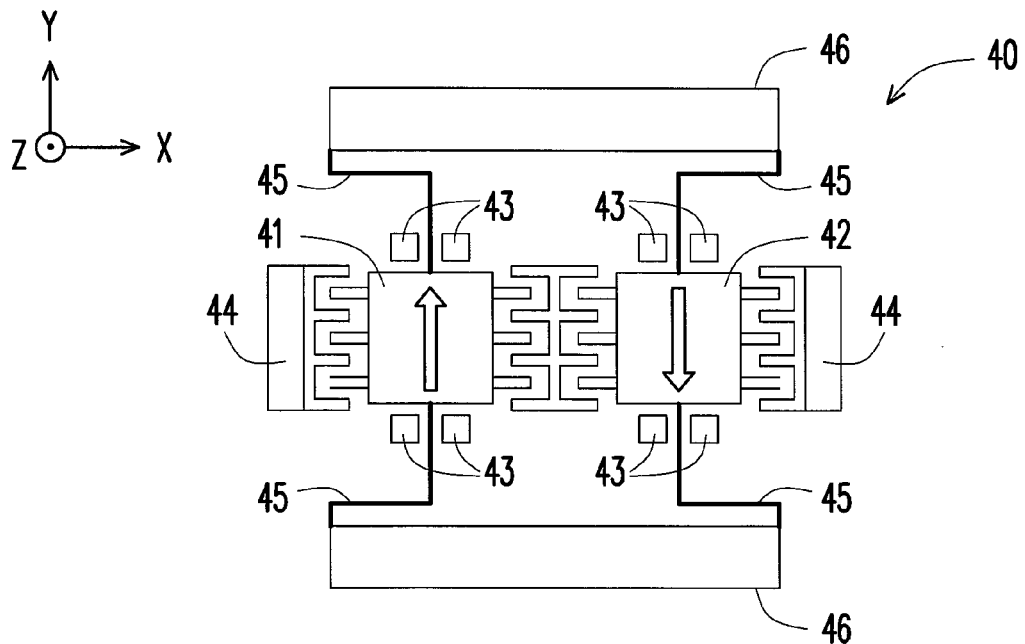
FIGS. 10A to 10C each show a schematic view of an equivalent system of a tuning fork type gyroscope.
Figure 10B:
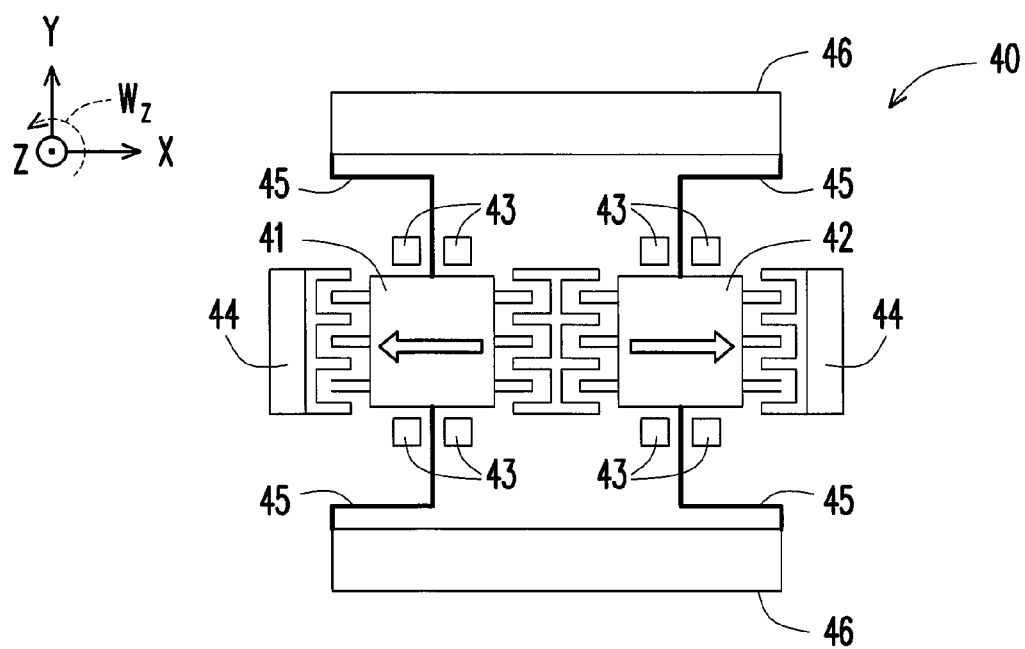
Figure 10C:
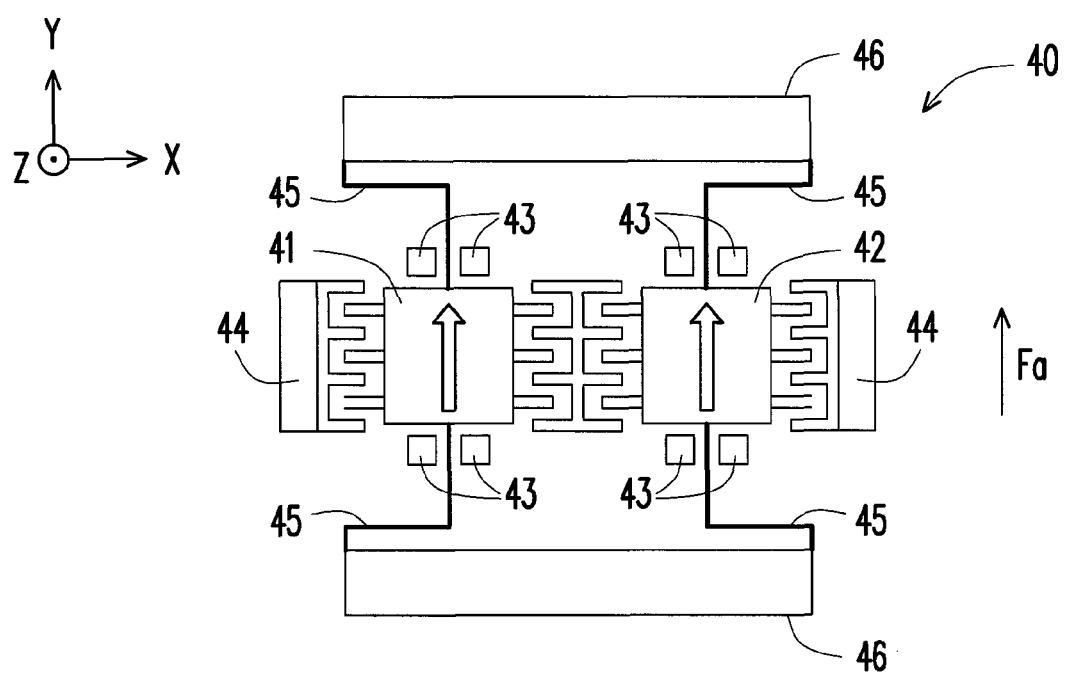
Figure 11A:
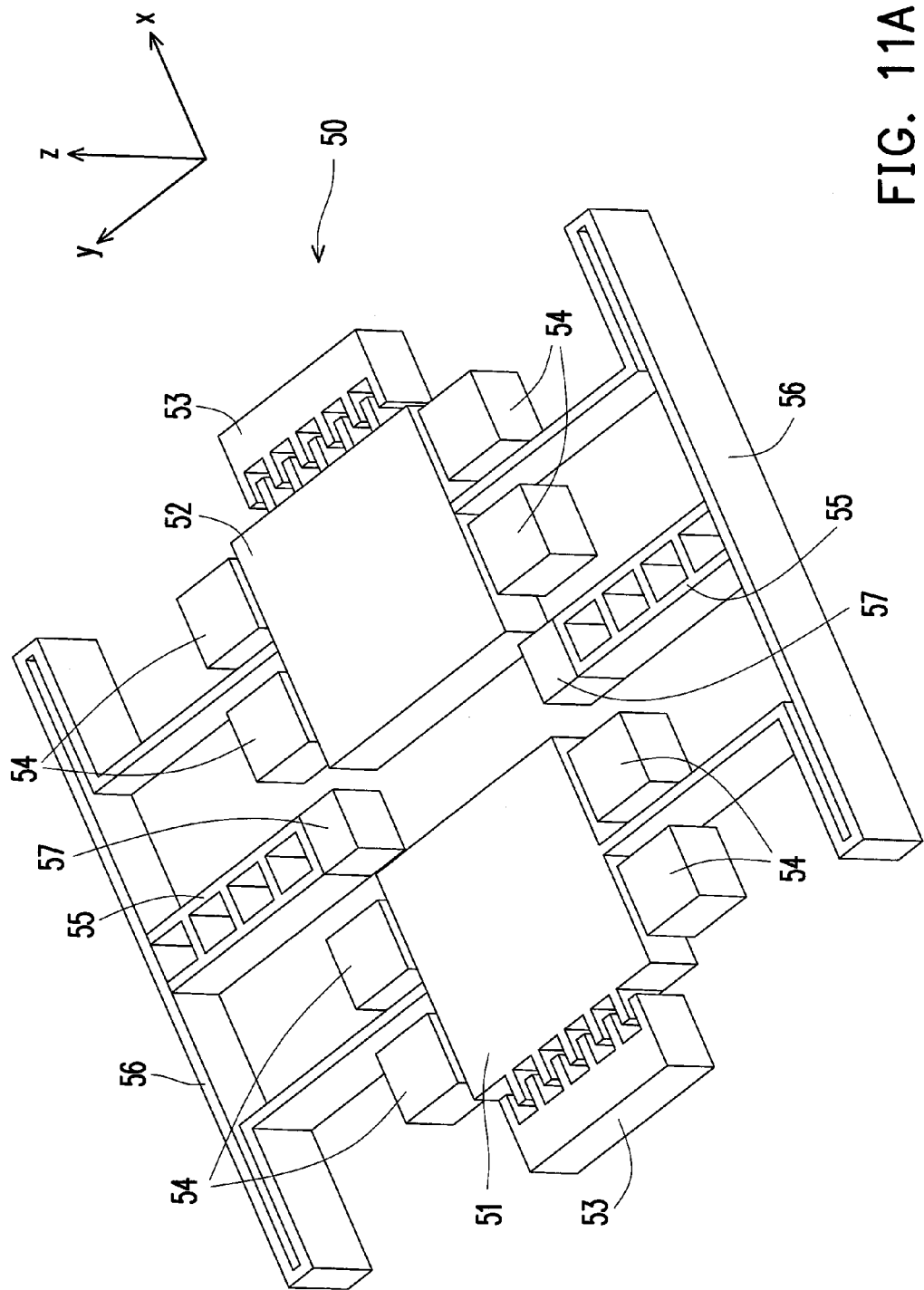
FIG. 11A is a schematic diagram of a tuning fork type gyroscope of U.S. Pat. No. 7,043,985.

Please refer to FIG. 8G. Next, at 90° C., 30% potassium hydroxide (KOH) solution removes the handle layer P2 of the SOI wafer. Hydrofluoric acid (HF) is then used to remove the $SiO_2$ layer P3. Then, deep reactive ion etching (DRIE) is performed to create the micro-structure (shown in FIG. 8H) of the MEMS device of an embodiment of the disclosure.

To sum up, in the embodiments of the disclosure, through a support and folded springs being connected between a lever and a base, the lever can rotate with the fulcrum. Thus, the structural design of the lever can cause two oscillating assemblies to be connected to the two ends of the lever. This way, when the MEMS device with oscillating assemblies is actuated, the two oscillating assemblies can move in opposite directions. In other words, the lever structure restrains the two oscillating assemblies to have only one degree of freedom. Therefore, the oscillating assemblies can perform opposite oscillation without being affected by fabrication variation. This further raises the sensitivity of the MEMS device.

In addition, the torsional beam connects the first proof mass and the third proof mass along a axis which is parallel with the X-axis and does not pass through the center of figure CA of the first proof mass. This causes the line connecting torsional beams to be located aside from the centroid of the first proof mass. Therefore, the first proof mass forms an unbalanced proof mass, which facilitates the rotation with the x-axis as the axis of rotation.

On the other hand, the MEMS device with oscillating assemblies of the disclosure further includes restraining springs between the movable electrode and the base, and a second assembly of springs traversing the first frame and connecting the third proof mass and the movable electrode. Since the restraining springs are disposed along the x-axis, and the fourth springs of the second assembly of springs are disposed along the y-axis, the third proof mass is restrained so that it can only transfer the x-axis displacement to the movable electrode.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An MEMS device, being adapted to control the displacement direction of two oscillating units comprising:
    at least one base;
    at least one lever;
    at least one first assembly of springs including:
        two elastic members, each of the elastic members connecting the at least one lever and the at least one base; and
    at least one support connecting the at least one lever and the two elastic members, wherein the at least one support is surrounded by the two elastic members, the at least one lever and the at least one base, the at least one lever is connected to one portion of the at least one support and the two elastic members are respectively connected to other portions of the at least one support; and
    two oscillating units, wherein one oscillating unit is connected to an end of the at least one lever and the other oscillating unit is connected to the other end of the at least one lever,
    wherein the at least one first assembly of springs is connected to the at least one lever, so the at least one lever can use the at least one first assembly of springs to rotate by treating a third axis as the axis of rotation to drive the oscillating unites to move back and forth in opposite directions with respect to each other.

2. The MEMS device of claim 1, wherein the two oscillating units are two oscillating assemblies, each of the two oscillating assemblies comprising:
    at least one first frame connected to an end of the at least one lever and having an oscillating direction along a second axis, wherein the second axis is orthogonal to the third axis;
    at least one third proof mass disposed within the first frame;
    at least one movable electrode;
    a plurality of restraining springs connecting the at least one movable electrode and the at least one base, wherein a stiffness in a second axis of each of the plurality of restraining springs is greater than a stiffness in a first axis of each of the plurality of restraining springs, and the first axis is orthogonal to the second axis and the third axis;
    at least one second assembly of springs, traversing the first frame and connecting the third proof mass and the at least one movable electrode, including:
        at least one fourth spring aligned along the second axis; and
        at least one movable linkage, wherein an end of the movable linkage is connected to the at least one fourth spring and a moving direction of the at least one movable linkage is the same as the moving direction of the at least one movable electrode.

3. The MEMS device of claim 2, wherein the two oscillating units are two oscillating assemblies, and the lever leads the two oscillating assemblies oscillating in opposite directions along the second axis.

4. The MEMS device of claim 2, wherein the at least one third proof mass is a third frame with an opening that are connected by two ends of the at least one fourth spring.

5. The MEMS device of claim 4, the second assembly of springs further comprising:
   a central turning region of the at least one fourth spring;
   two turning regions of the at least one fourth spring disposed symmetrically with respectively to a central turning region of the at least one fourth spring; and
   at least one support linkage connecting two turning regions of the at least one fourth spring along the second axis;
   wherein, an end of the at least one movable linkage is connected to the central turning region of the at least one fourth spring.

6. The MEMS device of claim 2, wherein the at least one movable electrode includes a notch that is connected by an end of the at least one movable linkage.

7. The MEMS device of claim 2, wherein the movable linkage of the second assembly of springs further comprising:
   two first linkages, each of the first linkages connecting the at least one fourth spring and the at least one third proof mass; and
   at least one second linkage, connecting the at least one fourth spring and the at least one movable electrode.

8. The MEMS device of claim 7, wherein one end of the at least one second linkage connects a transition region which is located at a central portion of the at least one fourth spring, wherein a distance between the transition region at the central portion of the fourth spring and the third proof mass is shorter than a distance between the transition region at the central portion of the fourth spring and the movable electrode.

9. The MEMS device of claim 7, wherein one end of the at least one second linkage connects a transition region which is located at the central portion of the at least one fourth spring, wherein a distance between the transition region at the central portion of the fourth spring and the third proof mass is longer than a distance between the transition region at the central portion of the fourth spring and the movable electrode.

10. The MEMS device of claim 2, wherein the movable linkage of the second assembly of springs further comprising:
    two first linkages, each of the first linkages connecting the at least one fourth spring and the at least one movable electrode; and
    at least one second linkage connecting the at least one fourth spring and the at least one third proof mass.

11. The MEMS device of claim 10, wherein one end of the at least one second linkage connects a transition region, which is located at the central portion of the at least one fourth spring, wherein a distance between the transition region at the central portion of the fourth spring and the third proof mass is shorter than a distance between the transition region at the central portion of the fourth spring and the movable electrode.

12. The MEMS device of claim 10, wherein one end of the at least one second linkage connects a transition region, which is located at the central portion of the at least one fourth spring, wherein a distance between the transition region at the central portion of the fourth spring and the third proof mass is longer than a distance between the transition region at the central portion of the fourth spring and the movable electrode.

13. The MEMS device of claim 2, wherein the second assembly of springs comprises:
    two fourth springs;
    a plurality of the movable linkages including:
       two first linkages; and
       two second linkages disposed between the two first linkages;
    wherein one end of each of the fourth springs connects the first linkages and the another end of each of the fourth springs connects the second linkages.

14. The MEMS device of claim 1, wherein the two oscillating units are two oscillating assemblies which are respectively connected to two corresponding ends of the lever;
    wherein each of the two oscillating assemblies includes:
    a first frame having an oscillating direction along a second axis;
    at least one third frame disposed within the first frame;
    at least one first proof mass disposed within the third frame;
    a plurality of torsional beams connecting the at least one first proof mass and the at least one third frame; and
    a plurality of first springs connecting the first frame and the at least one third frame along a first axis, wherein the first axis is orthogonal to the second axis.

15. The MEMS device of claim 14, wherein the two oscillating units are two oscillating assemblies, and the two oscillating assemblies oscillate in opposite directions along the second axis through the lever and the first assembly of springs.

16. The MEMS device of claim 14, wherein the at least one first proof mass is connected by the torsional beams along an eccentric axis of the first proof mass.

17. The MEMS device of claim 14, wherein the at least one first proof mass is a second frame connected by the torsional beams along an eccentric axis of the first proof mass.

18. The MEMS device of claim 14, wherein the torsional beams are connected to the at least one first proof mass along a central axis of the first proof mass, and the density of the at least one first proof mass is not distributed symmetrically with respect to the central axis.

19. The MEMS device of claim 14, wherein the torsional beams are connected to the at least one first proof mass along a central axis of the first proof mass, and the at least one first proof mass comprises at least one opening, and the mass of the at least one first proof mass is not uniformly distributed.

20. The MEMS device of claim 14, wherein the torsional beams are connected to the at least one first proof mass along a central axis of the first proof mass, a contour of the at least one first proof mass is not symmetrically shaped with respect to the central axis.

21. The MEMS device of claim 14, wherein the torsional beams are connected to the at least one first proof mass along a central axis of the first proof mass, a thickness of the at least one first proof mass is varied along the axis which is orthogonal to the central axis.

22. The MEMS device of claim 1, wherein the two oscillating units are two identical proof masses.

23. The MEMS device of claim 1, wherein the at least one support further comprises:
    a lateral beam, an end of the lateral beam connecting one of the two elastic members, and another end of the lateral beam connecting another elastic member; and
    a longitudinal beam connecting the lateral beam and the lever.

24. The MEMS device of claim 1, wherein the at least one support further comprises:
    an U-shaped beam with two ends connecting the lever; and
    two lateral beams, wherein each of the two lateral beams connects an outer portion of the U-shaped beam and one of the two elastic members.

25. The MEMS device of claim 1, wherein the at least one support further comprises:
    an U-shaped beam with two ends connecting the lever;
    a longitudinal beam connecting a concave portion of the U-shaped beam and the lever; and two lateral beams, wherein each of the lateral beam connects an outer portion of the U-shaped beam and one of the two elastic members.

26. The MEMS device of claim 1, wherein the support, being in a shape of an underlined plus sign, further comprises:
   two lateral beams, wherein one end of each of the two lateral beams connects one of the elastic member; and
   a longitudinal beam connecting the two lateral beams and the lever.

27. The MEMS device of claim 1, wherein the at least one support comprises:
   a U-shaped beam with two ends connecting the lever;
   a plurality of lateral beams, wherein two of the plurality of lateral beams connect an outer portion of the U-shaped beam and one corresponding elastic members, and another two of the plurality of lateral beams connect another outer portion of the U-shaped beam and another corresponding elastic member; and
   at least one longitudinal beam connecting a concave portion of the U-shaped beam and the lever.

28. The MEMS device of claim 1, further comprising:
   a plurality of buffer springs, wherein the two oscillating units are two oscillating assemblies, and each oscillating assembly is connected to a corresponding end of the lever by one buffer spring.

29. The MEMS device of claim 1, wherein the at least one lever is connected to at least one portion of the support, each of the two elastic members is respectively connected to at least one other portion of the support, the two oscillating units are two oscillating assemblies, and each of the two oscillating assemblies comprises:
   a first frame connected to an end of the at least one lever, the first frame oscillating along a second axis;
   a third frame disposed within the first frame;
   an unbalanced proof mass disposed within the third frame;
   a plurality of torsional beams connecting the unbalanced proof mass and the third frame;
   at least one first spring connecting the first frame and the third frame along a first axis;
   at least one movable electrode;
   a plurality of restraining springs connecting the at least one movable electrode and the at least one base, wherein a second stiffness in a second axis of each of the plurality of restraining springs is greater than a first stiffness in a first axis of each of the plurality of restraining springs;
   at least one second assembly of springs traversing the first frame and connecting the third frame and the at least one movable electrode, including:
   at least one fourth spring disposed along the second axis, wherein two ends of the at least one fourth spring is connected to the third frame; and
   at least one movable linkage connecting the at least one fourth spring and the at least one movable electrode, wherein a moving direction of the at least one movable linkage is the same as the moving direction of the at least one movable electrode.

\* \* \* \* \*